United States Patent
Shamam

(10) Patent No.: US 12,511,690 B2
(45) Date of Patent: Dec. 30, 2025

(54) COUNTER-PARTY TRADER SOCIAL NETWORKING SERVICE SYSTEM AND ASSOCIATED METHODS

(71) Applicant: Asher Shamam, Granada Hills, CA (US)

(72) Inventor: Asher Shamam, Granada Hills, CA (US)

(73) Assignee: Asher Shamam, Granada Hills, CA (US)

( * ) Notice: Subject to any disclaimer, the term of this patent is extended or adjusted under 35 U.S.C. 154(b) by 58 days.

(21) Appl. No.: 18/280,257

(22) PCT Filed: Feb. 2, 2022

(86) PCT No.: PCT/US2022/015000
§ 371 (c)(1),
(2) Date: Sep. 4, 2023

(87) PCT Pub. No.: WO2022/186939
PCT Pub. Date: Sep. 9, 2022

(65) Prior Publication Data
US 2024/0153000 A1      May 9, 2024

Related U.S. Application Data

(60) Provisional application No. 63/156,414, filed on Mar. 4, 2021.

(51) Int. Cl.
*G06Q 40/04* (2012.01)
*G06Q 50/00* (2012.01)

(52) U.S. Cl.
CPC ............. *G06Q 40/04* (2013.01); *G06Q 50/01* (2013.01)

(58) Field of Classification Search
CPC ..................................................... G06Q 40/04
See application file for complete search history.

(56) References Cited

U.S. PATENT DOCUMENTS

| | | | |
|---|---|---|---|
| 8,452,682 B1 * | 5/2013 | Gastineau | G06Q 40/04 |
| | | | 705/37 |
| 2008/0059382 A1 * | 3/2008 | Burczyk | G06Q 40/00 |
| | | | 705/37 |

(Continued)

FOREIGN PATENT DOCUMENTS

WO    2018009973 A1    1/2018

OTHER PUBLICATIONS

International Search Report and Written Opinion received in Patent Cooperation Treaty Application No. PCT/US2022/015000, dated May 13, 2022, 12 pages.

*Primary Examiner* — Scott C Anderson
(74) *Attorney, Agent, or Firm* — William A. Harding; Grable Martin PLLC

(57) ABSTRACT

A system and/or method of facilitating online social network trading relationships among multiple traders having opposing risk and reward positions vis-à-vis an asset. The social networking service (SNS) system for counter-party trading (e.g., equities, securities, commodities, options, futures, currencies) includes a networked server configured to receive a trade sharing level election and a counter-trade sharing level election (e.g., profit/loss target, margin reduction target). Upon detecting a complementary risk correlation between these sharing level elections, the server creates a coalesced order transaction record. A trader client app determines and displays a trade payoff function for the coalesced order transaction record, and a counter-trader app determines and displays a counter-trade payoff function for the coalesced order transaction record. The server receives from the trader client app and/or the counter-trader client (Continued)

app a respective coalesced trade acceptance. The trading parties' respective sharing level elections may be constant, linear, or non-linear.

20 Claims, 16 Drawing Sheets

(56) References Cited

U.S. PATENT DOCUMENTS

| | | |
|---|---|---|
| 2017/0178236 A1 | 6/2017 | Saigh et al. |
| 2017/0213289 A1 | 7/2017 | Doney |
| 2018/0276541 A1* | 9/2018 | Studnitzer .............. G06Q 40/04 |
| 2020/0294144 A1* | 9/2020 | Vogl ....................... G06Q 30/08 |
| 2021/0027377 A1* | 1/2021 | Rohlfs .............. G06F 16/24568 |
| 2021/0065296 A1* | 3/2021 | Nazari ................... G16H 40/67 |
| 2022/0122173 A1* | 4/2022 | Lopatin .................... G06N 7/01 |

* cited by examiner

Alpha Non Linear; Sa = Sb

Alpha Non Linear; Sa not Sb

COUNTER-PARTY TRADER SOCIAL NETWORKING SERVICE SYSTEM AND ASSOCIATED METHODS

RELATED APPLICATIONS

This application is a 371 national stage filing of and claims priority to PCT application serial number PCT/US2022/015000 filed Feb. 2, 2022, which claims the benefit under 35 U.S.C. § 119(e) of U.S. 5 Provisional Patent Application Ser. No. 63/156,414 titled COUNTER-PARTY TRADER SOCIAL NETWORKING SERVICE SYSTEM AND ASSOCIATED METHODS filed on Mar. 4, 2021, the entire contents of each of which are incorporated herein by reference.

FIELD OF THE INVENTION

The present invention relates generally to computer-implemented social networking service technology. More particularly, this invention pertains to devices, systems, and associated methods for facilitating online trading collaboration for sharing losses and returns between counter parties possessing negatively correlated payoff profiles.

BACKGROUND OF THE INVENTION

Commonly available online trading and brokerage platforms and/or trading apps provide a means of trading stocks, options, futures, and other derivative products to individual traders. However, known implementations (e.g., typical online trading platforms such as E*TRADE® or Fidelity®) do not provide functionality for sharing profits and losses among multiple disparate traders in cooperation with each other.

Known online trading and brokerage platforms and/or trading apps effectively place individual traders in a silo. An individual trader using these legacy platforms is not able to combine, or "coalesce," positions with a trading counter party who is pursuing an opposing complementary set of outcomes (e.g., one's profit to the other's loss).

As an example of the disadvantages of trading with legacy platforms, consider a simple trade such as selling short a naked call (derivative option) on an exchange traded sample stock (hereinafter given the fictitious ticker SMPE). Assume the initial margin requirements for placing a short call trade order using legacy platforms are typically around 10% to 20% of the underlying asset's value. Consequently, the margin requirement for one derivative call short consisting of one hundred (100) underlying shares of the SMPE stock trading at, say, around $300/share will be in the range of $3000 to $6000 dollars. This amount represents a potentially prohibitive initial margin requirement that may prevent a retail trader with less available money to meet these margin requirements from placing the trade in the first place. In such a situation, the prospective short call trader is often compelled to purchase an offsetting long call to create what is known as "a credit call spread" that results in a lesser margin requirement but at the expense of upside profit potential. The margin requirement described hereinabove is typical in terms of the percent amount of the underlying asset's value when trading stocks, options, futures, and other derivative products. These requirements are for the most part mandated by trading regulatory entities such as, for example, Financial Industry Regulatory Authority (FINRA).

Lacking from known online trading platforms is the ability to allow for the offsetting of opposing profit and loss outcomes of a particular trade like the one elucidated above with a corresponding complementary trade position for the purpose of alleviating the prohibitive legacy margin requirements. Also lacking from known online trading platforms is the ability to allow for the offsetting of opposing profit and loss outcomes of a particular trade like the one illustrated above with a corresponding complementary position to leverage the fact that some of the surfeit of traders may undoubtedly be interested in not just avoiding initial margin requirements, but also in mitigating profit and loss outcomes with peer traders who have assumed a complementary opposing trade position.

Accordingly, a need exists for a solution to at least one of the aforementioned challenges in providing flexibility to leverage a trading position with a complimentarily opposite trading position of another trader. For example, more flexible automated trading platforms are needed that offer risk mitigation paths to individual traders, as members of a common social networking community, for trading stocks, options, futures, and other derivative products.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to computer-implemented, web-enable trading systems and associated methods configured to facilitate traders of equities, options, commodities, currencies, futures, and other derivative products to coalesce their respective positions with the disparate positions of other opposing-interest traders for the purpose of risk management and financial advantage. Furthermore, embodiments of the present invention's collaborative-empowering functionality may operate to deliver a significant reduction, if not elimination, of initial margin requirements while using the present platform to execute trades of assets supported within structured trading venues across known global trading markets.

In one embodiment of the present invention, a social networking service (SNS) system for counter-party trading may include a server in a networked environment. The server may receive a trade transaction record having a trade sharing level election, and also may receive a counter-trade transaction record having a counter-trade sharing level election. Upon detecting a complementary risk correlation of the trade sharing level election and the counter-trade sharing level election, the server may create from the trade transaction record and the counter-trade transaction record a coalesced order transaction record. The SNS system may further comprise a trade client and a counter-trade client configured in data communication with the server via the networked environment. A trader client app operating on the trade client may determine and display, using the trade sharing level election and the counter-trade sharing level election, a trade payoff function for the coalesced order transaction record. A counter-trader app operating on the counter-trade client may determine and display, using the trade sharing level election and the counter-trade sharing level election, a counter-trade payoff function for the coalesced order transaction record. The server may transmit, based on the complementary risk correlation, a respective acceptance prompt to each of the trader client app and the counter-trader client app, and may receive from at least one of the trader client app and the counter-trader client app a respective coalesced trade acceptance.

In certain embodiments of the present invention, the coalesced order transaction record may be of one of an equity type, a security type, a commodity type, an option type, a future type, and a currency type. For example, and without limitation, the trade transaction record may be of a naked short call type, the counter-trade transaction record may be of a long call type, and the coalesced order transaction record may be of the equity type and further of a call spread type. The trade sharing level election may comprise a profit target, and the counter-trade sharing level election may comprise a loss target. Alternatively, or in addition, the trade sharing level election may comprise a trade margin reduction target, and the counter-trade sharing level election may comprise a counter-trade margin reduction target. The trade sharing level election and/or the counter-trade sharing level election may be of a sharing type of constant, linear, or non-linear.

In a method aspect of the present invention, a computer-implemented method of social networking for counter-party trading may comprise the steps of 1) receiving a trade transaction record characterized by a trade sharing level election, 2) receiving a counter-trade transaction record characterized by a counter-trade sharing level election, 3) detecting a complementary risk correlation of the trade sharing level election and the counter-trade sharing level election, and 4) creating, upon the detecting the complementary risk correlation, a coalesced order transaction record from the trade transaction record and the counter-trade transaction record. As described hereinabove, the coalesced order transaction record may be of an exchange-traded asset type selected from an equity type, a security type, a commodity type, an option type, a future type, and a currency type. Also as described hereinabove, the trade sharing level election and/or the counter-trade sharing level election may be of a sharing type selected from constant, linear, and non-linear.

In another method aspect of the present invention, the computer-implemented steps may comprise the following: 1) receiving a respective order from a pair of traders wherein the desired order of one trader is complementary and/or has a negatively correlated set of outcomes (e.g., profit/loss (P/L)) vis-à-vis the second trader's order; 2) executing through global exchanges (e.g. National Association of Securities Dealers Automated Quotations (NASDAQ), Chicago Board of Trade (CBOT), New York Stock Exchange (NYSE), and/or other international exchanges) a coalesced order comprising the complementary pair of orders; and 3) managing the coalesced position's components to a desired state of closure. The method aspect may therefore be characterized as creating coalesced trade transactions to operate as known financial products and instruments that are traded on traditional exchanges for the purpose of creating new pathways of risk and reward mitigation for the disparate traders whose positions are comprised of respective, yet complementary, positions that, in turn, make up the specific standard financial products and or instruments that are traded routinely on exchanges. Wide adoption of the present invention may advantageously create a unique exchange for a new community of participating counter-party traders, all the while compatible with standard and regulated products.

In another embodiment, a computer-implemented method and/or system may operate to match two or more asset holders (e.g., equity traders) possessing oppositely-correlated risk and reward profiles on the corresponding underlying asset or equity, or any derivative product of the underlying asset or equity (such as, but not limited to, stock options or futures or, more generally, any asset traded on regulated exchanges); and to coalesce these traders' complementary risk and reward profiles for the purpose of mitigating the different possible outcomes for their individual risk and reward profiles against one another.

In another embodiment, the computer-implemented method and/or system may operate to allow the coalescing of complementary risk and reward profiles on an asset owned by two or more entities, wherein, for example, the first entity owns an asset whose profit versus loss outcomes as a function of the underlying asset's spot price or market price, as determined by supply and demand market forces, is negatively correlated to the corresponding profit versus loss outcomes of the second entity.

In another embodiment, the computer-implemented method and/or system may operate to empower a trader desiring to place a trade on a financial product offered on exchanges with the capability of coalescing their trade with a disparate trader who owns a complementary position in the same financial product. For example, and without limitation, a trader may choose the P/L sharing level, and type of sharing (whether constant, linear, or non-linear desired for a position on a financial product in their portfolio) that is to be subsequently coalesced with a position of a disparate trader who has agreed to the same P/L level and type of sharing as the first trader, and who has a complementary (and, therefore, negatively correlated) position on the same asset, and vice versa.

In another embodiment, a computer-implemented method and/or system may operate to provide means for a first trader or group of traders and a second trader or group of traders having a negatively correlated profit and loss set of outcomes relative to one another, to coalesce their trades for the purpose of risk mitigation and or margin requirements mitigation where both traders and/or group of traders are trading in financial products that are routinely traded on exchanges.

In another embodiment, the computer-implemented method and/or system may comprise (a) a server computer and (b) a trading application executing on the computer; wherein the trading application, via an internet connection, may invoke instructions on the computer which in turn may execute the trades on exchanges for the traders.

In another embodiment, the computer-implemented method and/or system may operate to prompt the first trader to select an exchange traded asset to trade, and then to select the preferred level of profit and loss sharing level, and a second trader to select an exchange traded asset, and the same level of profit and loss level as the first trader where the profit and loss outcomes of the two traders is complementary in the sense of having a negatively correlated profit and loss outcome profile.

In another embodiment, the computer-implemented method and/or system may comprise the trading application further configured to communicate to the trading platforms computer, invoke script instruction in the trading platform computer, which in turn may execute the two coalesced trades through a third party connected to exchanges or directly through the exchange.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Referring initially to FIGS. 1 through 22, a counter-party trader social networking service (SNS) system according to an embodiment of the present invention is now described in detail. Throughout this disclosure, the present invention may be referred to as a counter-party trader service system, a counter-party trader system, a counter-party trader service, a counter-party trader app, a co-trading service, a co-trading system, a service, a system, a product, and/or a method for counter-party automated trading. Embodiments of the invention may include systems and methods, including mathematical methods differing in specific detail from the ones illustrated in the figures and examples below, but nonetheless delivering the same functionality for managing or mitigating profit and loss outcomes between two disparate traders having complementary or opposite profit and loss outcomes. Those skilled in the art will appreciate that this terminology is only illustrative and does not affect the scope of the invention.

Figure 1:
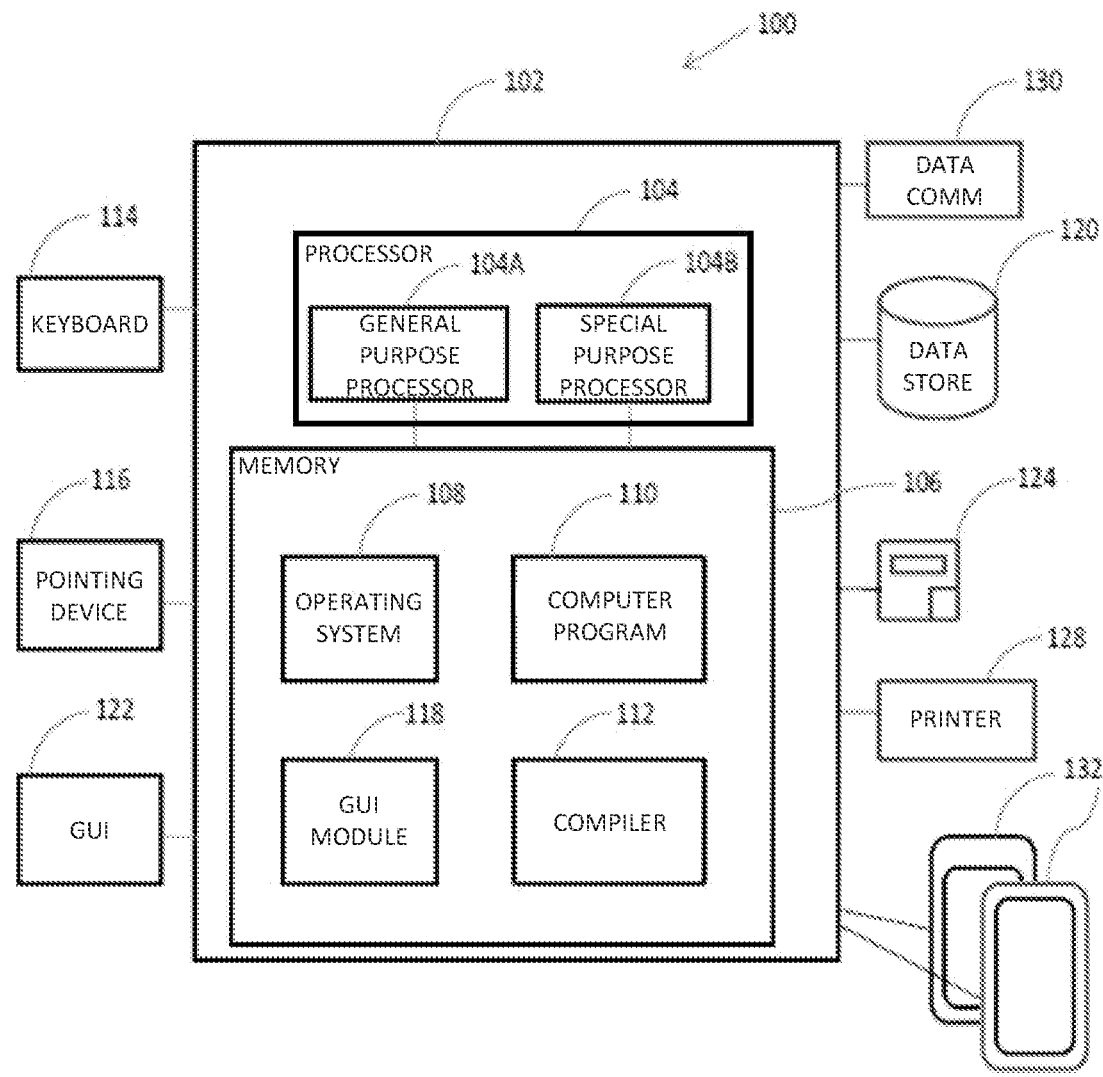
FIG. 1 is an exemplary counter-party trader social networking service (SNS) system according to an embodiment of the invention.

Referring initially to FIG. 1, an exemplary hardware and software environment 100 used to implement an embodiment of the present invention will now be described in detail. The hardware and software environment 100 may include a computer 102 configured in data communication with some number of peripheral devices and/or auxiliary computing devices. Computer 102 may be a user/client computer, server computer, and/or a database computer. The computer 102 may comprise a general purpose processor 104A and/or a special purpose processor 104B (hereinafter also collectively referred to as a processor 104), and also may comprise a memory 106, such as random-access memory (RAM). The computer 102 may be coupled in data communication to, and/or integrated with, peripheral devices including input/output (110) devices such as a keyboard 114, a cursor control device 116 (e.g., a mouse, a pointing device, pen and tablet, touch screen, multi-touch device) and/or a printer 128. In certain embodiments, computer 102 may be connected via the internet to a multi-touch device (e.g., mobile phone 132) or other internet-enabled device executing on various platforms and operating systems.

In one embodiment, the computer 102 may comprise a general-purpose processor 104A configured to perform computer instructions defining a computer program 110 under control of an operating system 108. The computer program 110 and/or the operating system 108 may be stored in the memory 106 and may interface with the peripherals and/or auxiliary devices to accept input and commands and, based on such input and commands, and on the instructions defined by the computer program 110 and operating system 108, to provide output and results.

Output/results controlled by a graphical user interface (GUI) module 118 may be presented on a graphical user interface (e.g., display) 122 or provided to another device, such as the mobile device 132, for presentation and/or further processing or action. In one embodiment, the display 122 may comprise a liquid crystal display (LCD) having a plurality of separately addressable liquid crystals. Although the GUI module 118 is depicted as a separate module, the instructions performing the GUI functions may be resident or distributed in the operating system 108, the computer program 110, and/or implemented with special purpose memory and processors. In certain embodiments, the display 122 may comprise a multi touch device having a touch sensing surface (e.g., track pod or touch screen) with the ability to recognize the presence of two or more points of contact with the surface.

Some or all of the operations performed by the computer 102 according to the computer program 110 instructions may be implemented in a special purpose processor 104B. In one embodiment, some or all of the computer program 110 instructions may be implemented via firmware instructions stored in a read only memory (ROM), a programmable read only memory (PROM) or cache memory within the special purpose processor 104B or in memory 106. The special purpose processor 104B may also be hardwired through circuit design to perform some or all of the operations to implement the present invention. Further, the special purpose processor 104B may be a hybrid processor, which may include dedicated circuitry for performing a subset of functions, and other circuits for performing more general functions such as responding to computer program 110 instructions. In one embodiment, the special purpose processor 104B may be an application specific integrated circuit (ASIC).

The computer 102 may also implement a compiler 112 that allows an application or computer program 110 written in a high-level programming language to be translated into processor 104 readable code. Alternatively, the compiler 112 may be an interpreter that executes instructions/source code directly, translates source code into an intermediate representation that may be executed, or that may execute stored precompiled code. The present invention's program codes 110 may access and manipulate data accepted from I/O devices and stored in the memory 106 of the computer 102 using the relationships and logic generated using the compiler 112.

The computer 102 also optionally may comprise an external communication device such as a modem, satellite link, Ethernet card, or other device for accepting input from, and providing output to, other auxiliary computing devices (e.g., mobile phone 132).

In one embodiment, instructions implementing the operating system 108, the computer program 110, and/or the compiler 112 may be tangibly embodied in a non-transient computer-readable medium (e.g., data storage device 120) which may include one or more fixed or removable data storage devices, such as a flash drive, hard drive, CD-ROM drive, and/or tape drive. Further, the operating system 108 and the computer program 110 may be comprised of computer program instructions which, when accessed, read and executed by the processor 104, may cause the computer 102 to perform the steps necessary to implement and/or use the present invention or to load the program of instructions into the memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product according to the invention. As such, the term computer program product, as used herein, is intended to encompass a computer program accessible from any computer readable device or media.

Persons skilled in the art will immediately recognize that combination of the above components, and/or any number of different components, peripherals, and other devices, may be used with the computer 102 to deliver the functionality of the present invention.

Figure 2:
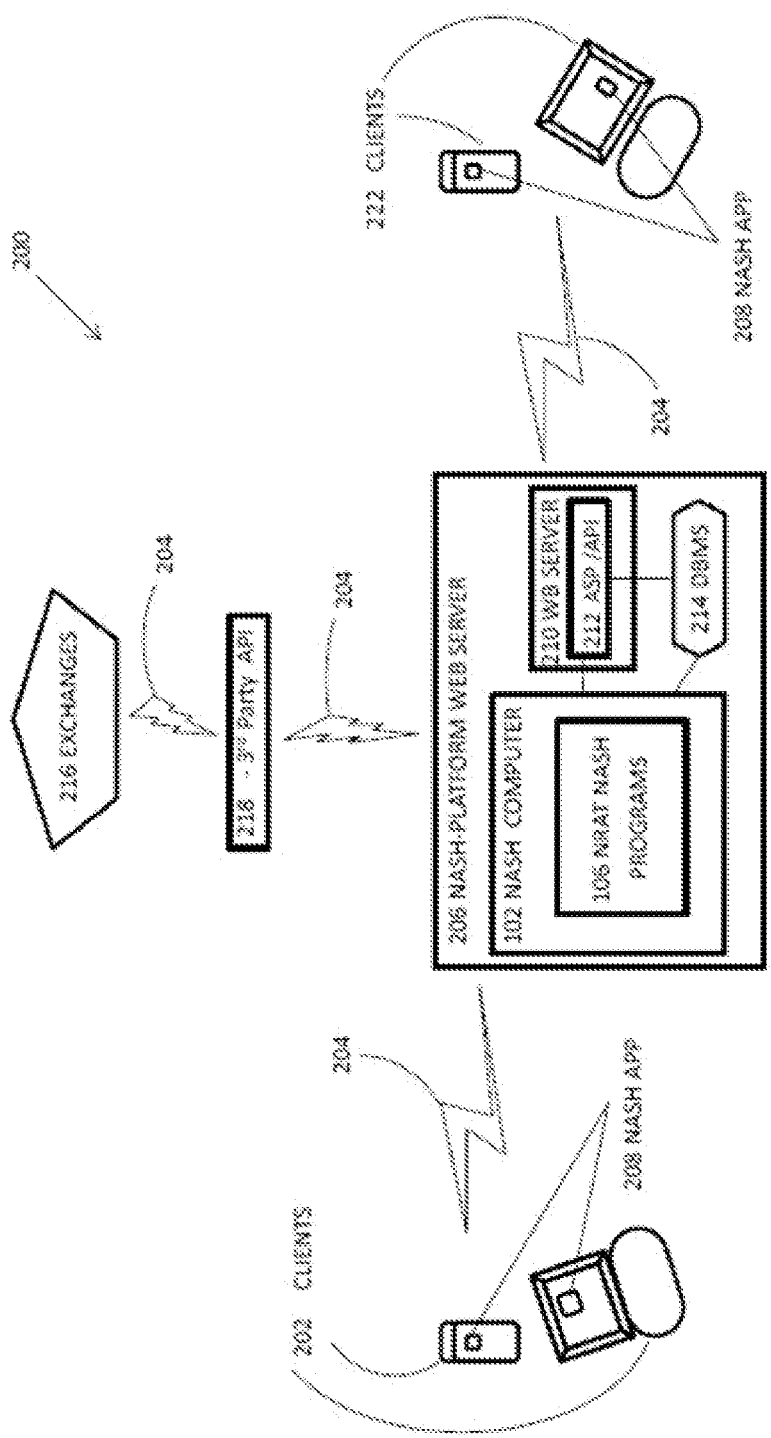
FIG. 2 a schematic diagram of an exemplary distributed computer system configured to host an exemplary counter-party trader SNS system using a network to connect client computers to server computers according to an embodiment of the invention.

Referring now to FIG. 2, and continuing to refer to FIG. 1, a distributed computer system 200 is schematically illustrated comprising a network 204 configured in data communication with client computers 202, 222 and a server computer 206 configured as a NASH server web platform. In one embodiment, a combination of resources may include a network 204 comprising one or more of the Internet, LANs (local area networks), WANs (wide area networks), and/or SNA (systems network architecture) networks; clients 202, 222 that may be personal computers, workstations, or mobile devices; and the NASH platform server 206 that may be one or more personal computers, workstations, minicomputers, and/or mainframes.

A person of skill in the art will immediately recognize that different networks such as a cellular network (e.g., global system for mobile communications (GSM)), a satellite-based network, and/or any other type of network may be used to connect cell phones, for example, and without limitation, of clients 202, 222 and servers 206 in accordance with embodiments of the present invention.

A network 204 such as the Internet may connect clients 202, 222 to server computers 206. Network 204 may utilize Ethernet, coaxial cable, wireless communications, and/or radio frequency (RF) to connect and provide the communication between clients 202, 222 and the NASH platform server 206. Clients 202, 222 each may execute a respective client application, such as a NASH app 208 and/or web browser; and may communicate with the server computers 206 executing web servers 210. Furthermore, the software executing on clients 202, 222 may be downloaded from the server computer 206 to client computers and/or mobile devices 202, 222, and installed as, for example, and without limitation, an application or a NASH GUI 208, a plug-in or control of a web browser.

Accordingly, clients 202, 222 may utilize control components/component object model (COM) or distributed COM (DCOM) components to provide a user interface on a display of a client 202, 222.

Web server 210 may host an Active Server Page (ASP) or Internet Server Application Programming Interface (ISAPI) application 212, which may be configured to execute scripts. The scripts may invoke objects that execute business logic (referred to as business objects). The business objects then may, through a database management system (DBMS) 214, manipulate data in a database which may be a part of one or more global exchanges 216 such as NYSE, NASDAQ, London Stock Exchange, Hong Kong Stock Exchange, or other known exchanges. In another embodiment, exchange database 216 may be part of, or connected directly to, clients 202, 222 through network 204. When the business functionality is encapsulated into objects, the system 200 may be referred to as a component object model (COM) system. Accordingly, the scripts executing on web server 210 (and/or interface application 212) may invoke COM objects that may implement the business logic. Further, server 206 may utilize a component-based processing system to access required data stored in exchange database 216 via an interface such as ADO (Active Data Objects), OLE DB (Object Linking and Embedding DataBase), or ODBC (Open DataBase Connectivity).

Still referring to FIGS. 1 and 2, embodiments of the present invention may be implemented as instances of the NASH Trading software application 208 (NASH Trading app) on clients 202, 222 and/or server computer 206 (NASH Trading platform servers). Furthermore, as described above, clients 202, 222 and/or server computer 206 may comprise a respective thin client device or a portable device that may feature a multi-touch-based display (i.e., a tablet device), a mobile phone, an IP (internet protocol) enabled television, and/or other internet enabled device running on various platforms and operating systems. For example, and without limitation, users may communicate and interact with the software application using a mobile device 132, client computer 202, 222, and/or portable device.

As described above, mobile device 132 and/or client 202, 222 may communicate and interact using a variety of networks 204 with NASH Server 206. Mobile application software (commonly referred to as an "app") may be installed and/or utilized on mobile devices 132 and/or clients 202, 222. Such an app 208 may be downloaded from an application marketplace or online store of applications or directly from the NASH Server 206.

On the server side 206, a client 202, 222 may employ NASH Server 206 to access data from exchanges 216, where the server 206 may be connected directly to exchange database 216 or may be alternatively connected to one or more exchanges 216 via a third-party API 218. Hence, NASH Trade platform 206 may provide an interactive experience to a variety of app users (also referred to herein as NASHERs) who may access the NASH Trade Server 206 from their clients 202, 222.

Users accessing the NASH trading server (also referred to herein as a trading "site" 206) may be members of site 206 (e.g., those having a registered trading account) or may access information without being members. In the latter regard, access to the site 206 or certain areas of site 206 such as components 210, 212, 214 may be limited to clients 202, 222, 132 of users who are not members and are logged into site 206. Such a login may be automatic (e.g., preconfigured using cookies on a web browser or by storing a username/password on the user's device 202, 222 or in the app 208 on the user's device 202, 222).

Either as part of the NASH trading site 206 or executing separately from the NASH trading site 206, and or residing in 202, 222, various application like the present invention's Nash Trading app 208 may be used to provide additional features to the NASH trading site 206. A person of skill in the art will immediately recognize that the description is not limited to the applications depicted in FIG. 2 and additional applications may be used to provide the features described herein. Furthermore, such applications may be directly integrated with (e.g., are an integral part of) NASH trading site 206, and may interact with each other, and or may interact directly with the user client 202, 222 through the NASH app 208.

NASH apps 208 may provide a variety of functionality ranging from statistical analysis of trading products such as stocks, options, futures, and other derivative products, to opinions or predictions of other traders, to media content discovery, and the like. For example, and without limitation, one NASH app 208 may have the functionality of a recommendation engine that may be configured to recommend specific trades, or trade strategies, to a user at the client 202, 222 (e.g., based on content gathered and/or stored by NASH trading site 206), where DBMS 214 may manage all the data that may be stored in or accessible from exchanges 216.

The NASH platform 206 and the corresponding processing capabilities that provide an integrated graphical user interface that may display connectivity status and various trading products available on exchanges 216 and between users/objects may be performed by clients 202, 222; by server 206; and/or by a combination of clients 202, 222 and server 206.

As used herein, NASH trading site 206 may refer to a platform or service (e.g., website, web service, application) that may enable users at clients 202, 222 to coalesce their disparate and/or offsetting trades into a single trade (also referred to as a net trade) that is equivalent, by the present invention's mathematical structure, to a standard product available on exchanges 216. Such products may typically comprise and/or be based on stocks, commodities, currencies, and/or the underlying derivatives traded on such as, for example, and without limitation, options, futures, or other derivative products.

As for the functionality enabling the coalescing of two or more disparate positions through the NASH app 208, or directly through the Nash trading platform 206, such functionality may result in a standard product traded on an exchange 216. For example, and without limitation, a Credit Call Spread on an underlying stock, as one skilled in the art will immediately recognize, may be composed of a Short Call trade combined with a simultaneous Long Call trade on the same underlying asset. Through the NASH trading site 206 or the NASH trading app 208 installed on client devices 202, 222, this complex two leg position, routinely traded on known exchanges 216, may be decomposed into its disparate components whereby each component may be held by the individual NASHERs, and the collective position of the NASHERs may be managed by a NASH script executing on platform 206.

As described above, the NASH platform 206 may be web-based and may provide means for users to trade over a network 204 (e.g., the Internet, e-mail, and instant messaging). Trading site 206 may allow users to trade all assets, currencies, products, and any corresponding derivatives of these assets that may be available through exchanges 216. However, embodiments of the invention are not limited to a trading network of the types described above, but instead may cover any type of trading environment 200 where users may connect/communicate with one another and objects via electronic means.

Nash Trading Application Exemplary Overview

Referring now to FIGS. 3-14, and continuing to refer to FIGS. 1 and 2, the NASH trading application's 208 operational functionality for several complex derivative trades made up of two independent legs according to an embodiment of the present invention will now be described in detail. For example, and without limitation, one leg may be a short derivative on an underlying stock held by a first user of clients 202, and the other leg may be the offsetting long derivative position held by a second user of client 222. As noted above, at the core of the present invention may be the coalescing functionality of the disparate positions entered at clients 202 and 222 respectively, resulting in a standard product traded on exchange 216.

Each of the computer-implemented displays of FIGS. 3 through 16 may represent a step in a sequence of steps that may be carried out by clients 202, 222 to consummate a trade that may employ the present inventions risk mitigation functionality. With regards to these figures, a person skilled in the art will immediately recognize that FIGS. 3 through 16 collectively represent one possible embodiment of the NASH app 208 functionality that clients 202, 222 may interact with to provide the input required to execute the present invention within the overall distributed computing system illustrated in 200.

Figure 3:
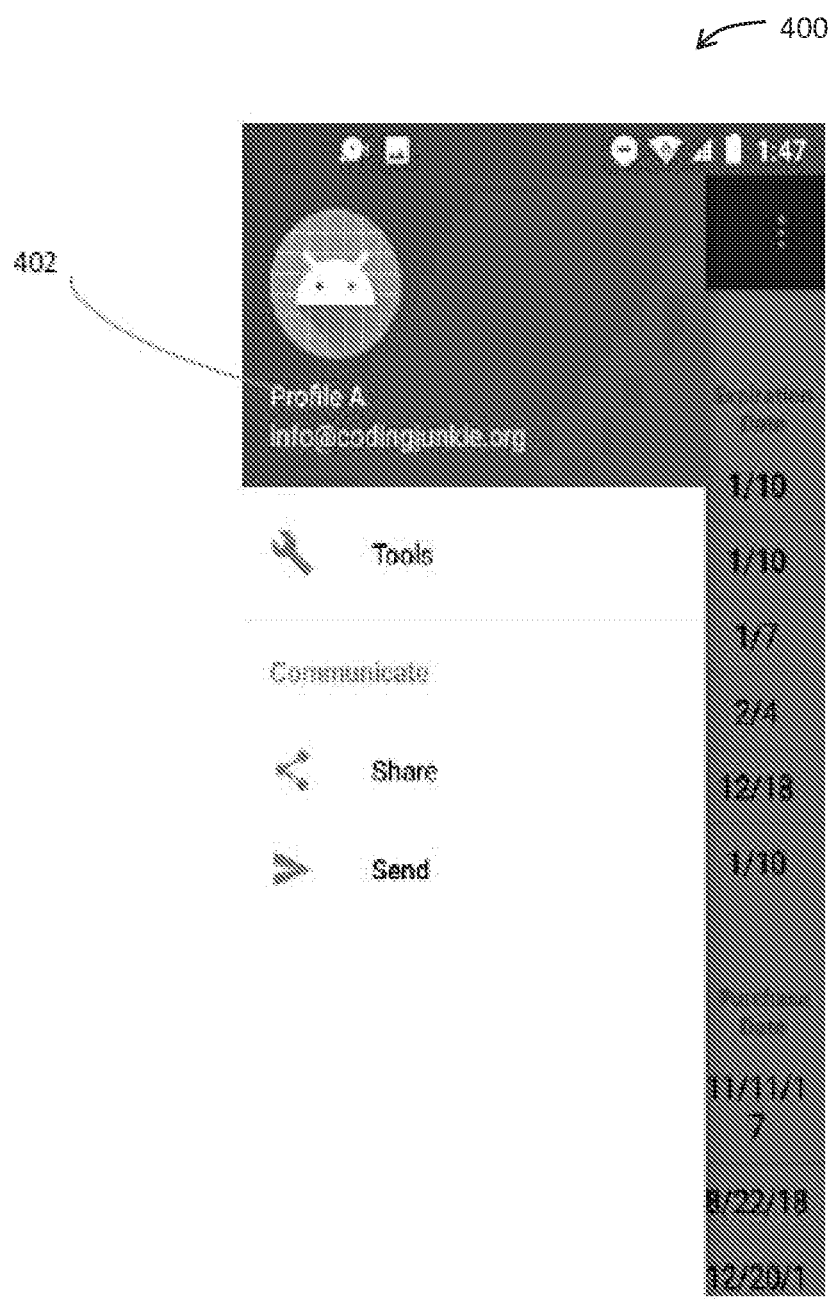
FIG. 3 is an exemplary computer-implemented display illustrating active use of a counter-party trading functionality according to an embodiment of the invention.

FIG. 3 illustrates the particular profile 402 of the first user of client 202 as it may display on client's 202 screen 400 through the downloaded application 208. The second user of client 222 (and, indeed, any user of a copy of the NASH application 208) may similarly build and maintain a respective profile that may similarly display on client 222.

Figure 4:
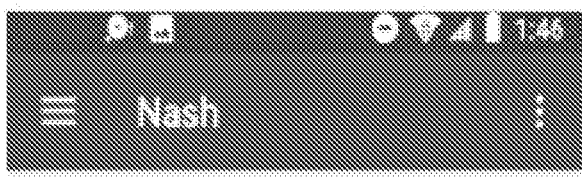
FIG. 4 is an exemplary computer-implemented display illustrating current asset positions using a counter-party trading functionality according to an embodiment of the invention.

FIG. 4 illustrates the client's 202 display 500 of an exemplary current portfolio of stocks and stock options for the user of client 202. For example, and without limitation, asset 502 (AMZN) with date of expiry 504 is depicted as it may appear on client's 202 portfolio screen 500.

Figure 5:
FIG. 5 is an exemplary computer-implemented display illustrating current asset positions using a counter-party trading functionality according to an embodiment of the invention.

FIG. 5 illustrates the client's 222 display 700 of an exemplary current portfolio of stocks and stock options for the user of client 222. For example, and without limitation, asset 702 (AMZN) with date of expiry 704 is depicted as it may appear on client's 222 portfolio screen 700.

Figure 6:
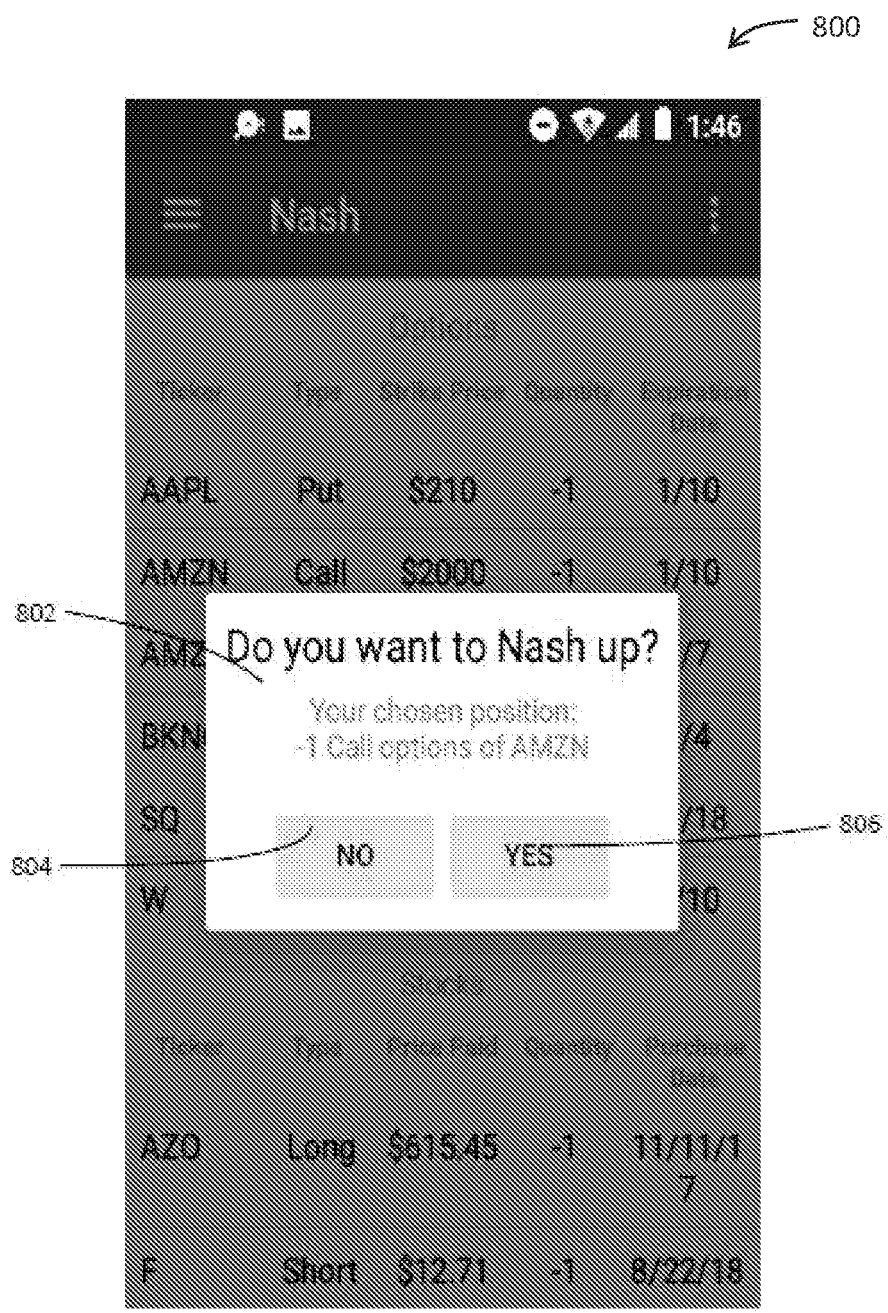
FIG. 6 is an exemplary computer-implemented display illustrating a decision prompt using a counter-party trading functionality according to an embodiment of the invention.
Figure 7:
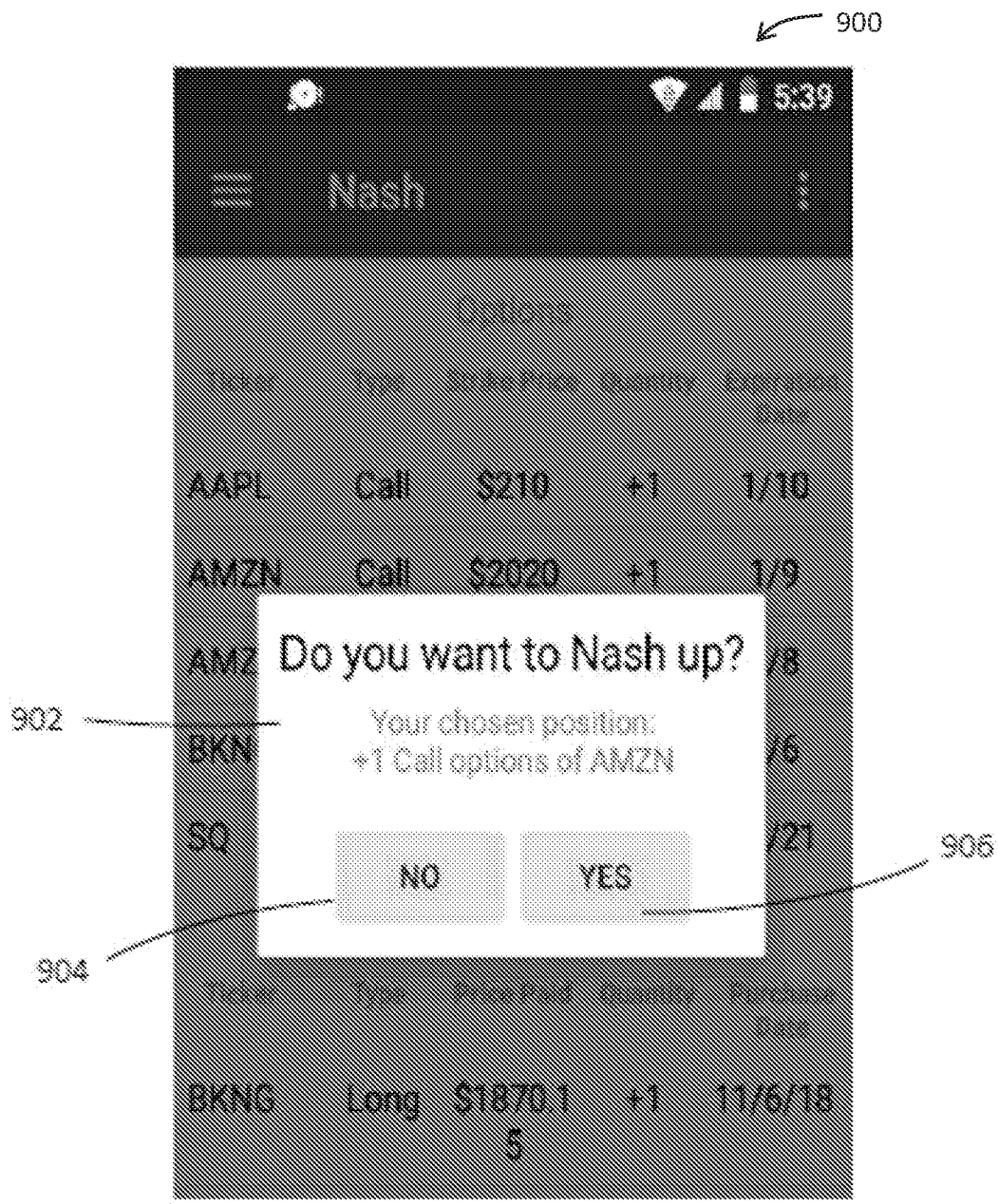
FIG. 7 is an exemplary computer-implemented display illustrating a decision prompt using a counter-party trading functionality according to an embodiment of the invention.

FIGS. 6 and 7 illustrate the resulting dialogue boxes 802 and 902 as they may appear, for example, and without limitation, after client 202 selects asset 502 and/or client 222 selects asset 702, respectively. Dialogue box 800 may be displayed by the NASH App 208 installed on client's 202 cell phones or workstations. This particular NASH app version illustrates one plausible dialogue box interface, whereby clients 202, 222 may interact with the NASH Platform 206 through internet connections 204, and whereby these client interactions may result in the generation of script or business objects to be executed by NASH computer 102.

In dialogue box 802 of FIG. 6, if client 202 selects NO 804, then the functionality of the present invention may not be invoked, and an ordinary legacy trade may or may not commence next depending on client 202's choice. Similarly, in dialogue box 902 of FIG. 7, if client 222 selects NO 904, then the functionality of the present invention may not be invoked, an ordinary legacy trade may or may not commence next depending on client 202's choice.

If, however, in the FIG. 6 dialogue box 802 client 202 selects YES 806, then the functionality of the present invention may be invoked. Similarly, if client 222 selects YES 906, in dialogue box 902, then the functionality of the present invention may be invoked. In this case, both clients agree to coalesce their disparate positions using the invention's risk and reward sharing functionality, and they select a mutually agreed upon level of sharing (referred to hereinafter as "alpha" $\alpha$).

Figure 8:
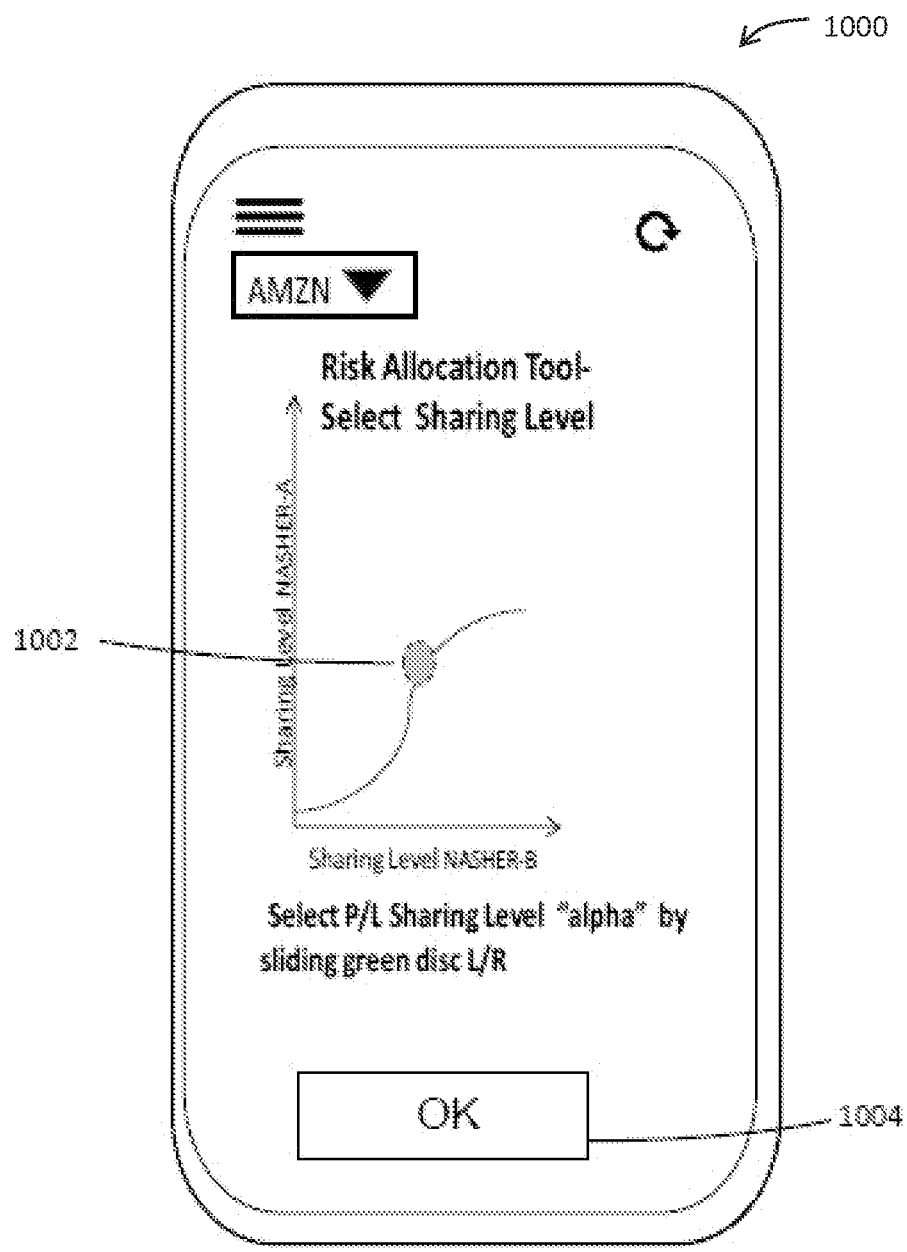
FIG. 8 is an exemplary computer-implemented display illustrating level of risk and return sharing selection using a counter-party trading functionality according to an embodiment of the invention.

FIG. 8 illustrates an exemplary display 1000 on client's 202 cell phone 132 that may appear in response to a YES 806 selection from client 202, and/or a YES 906 selection from client 222, respectively. More specifically, the display 1000 on client's 202 after selecting YES on 806 may also be the resulting display on 222 after selecting YES 906. This display 1000 may be common to both clients 202 and 222 after they select YES 806 and YES 906 in boxes 800 and 900, respectively. Further, display 1000 may present an interactive selection disk 1002 that may be manipulated left or right by a user. By moving the selection disk 1002 left or right, clients 202, 222 may select a common level of profit and loss sharing, a, that each respective trader desires during the consummation of their trades through the present invention's risk mitigation functionality.

The sharing level $\alpha$ may be a constant, or may instead be dependent on several of the underlying parameters such as, but not limited to, the spot price of the underlying asset traded, S; time t; etc. In the examples described hereinbelow, some exemplary scenarios involving different choices of the sharing level a are presented. In the present example, a is a general and nonconstant function of the underlying spot price S. Appendix I(a) discusses one possible form of a precise mathematical structure by which the different choices of $\alpha$ may be incorporated into the consummation and subsequently management of the combined positions.

Figure 10:
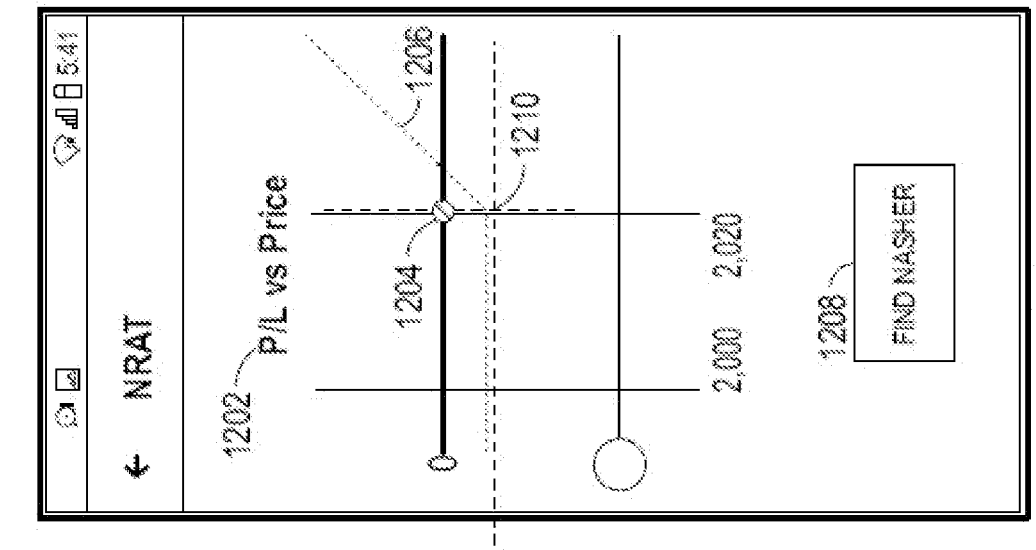
FIG. 10 is an exemplary computer-implemented display illustrating Long-Call Legacy payoff profit and loss profile using a counter-party trading functionality according to an embodiment of the invention.
Figure 9:
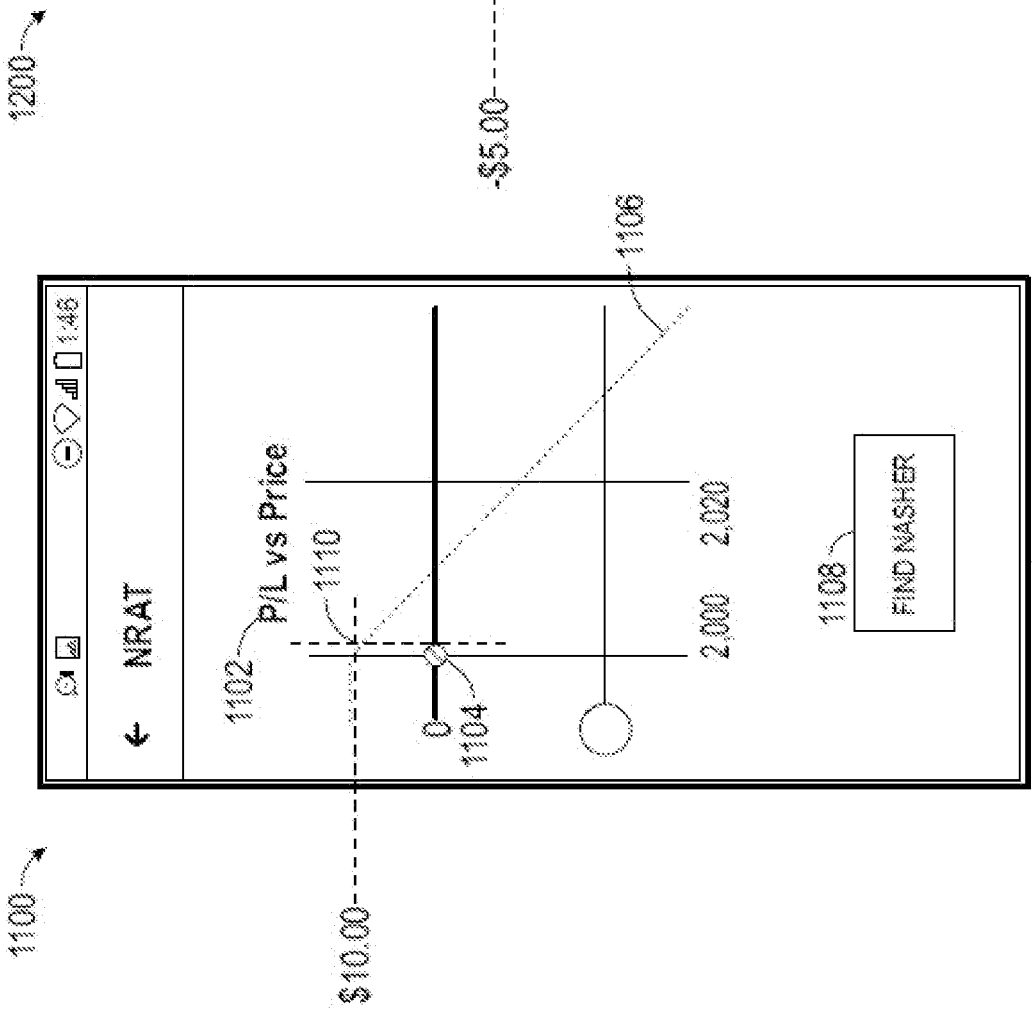
FIG. 9 is an exemplary computer-implemented display illustrating Naked-Short-Call Legacy payoff profit and loss profile using a counter-party trading functionality according to an embodiment of the invention.

Referring now to FIGS. 9 and 10, the respective display 1100, 1200 on each of clients' 202, 222 GUI screens is illustrated, corresponding to the current step that may be requisite to consummating a trade using the NASH app 208. FIG. 9 illustrates an exemplary display 1100 for client 202, on a profit and loss (P/L) pair of axes 1102, the Legacy profile or payoff function 1106 of the selected asset 502 that may be tradable on exchanges 216. Recall from FIG. 10 that asset 502 of FIG. 5 has a strike price 1104 of $2000. Client 202 may select FIND NASHER 1108 to commence the coalesce trade functionality of the present invention. FIG. 10 illustrates an exemplary display 1200 for client 222, on a profit and loss P/L axis 1202, the profile or payoff function 1206 of the selected asset 702 of FIG. 5 that may be tradable on exchanges 216, prior to finding an offsetting trader 202 through NASH Platform 206. Recall asset 702 of FIG. 7 has a strike price 1204 of $2020. Client 222 may select FIND NASHER 1208 to commence the coalesce trade functionality of the present invention.

Figure 12:
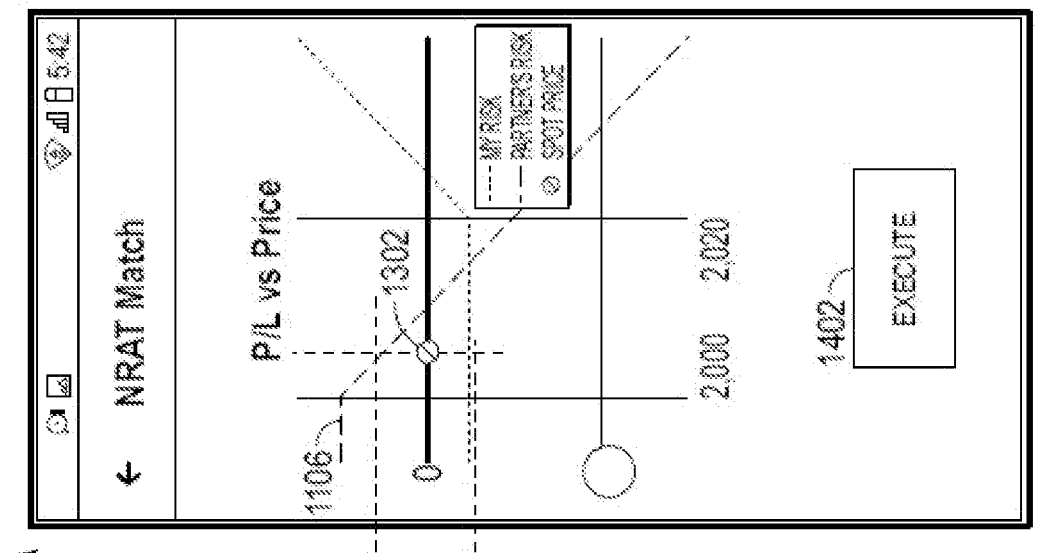
FIG. 12 is an exemplary computer-implemented display illustrating both legacy payoffs for the trading scenario illustrated in FIGS. 9 and 10.
Figure 11:
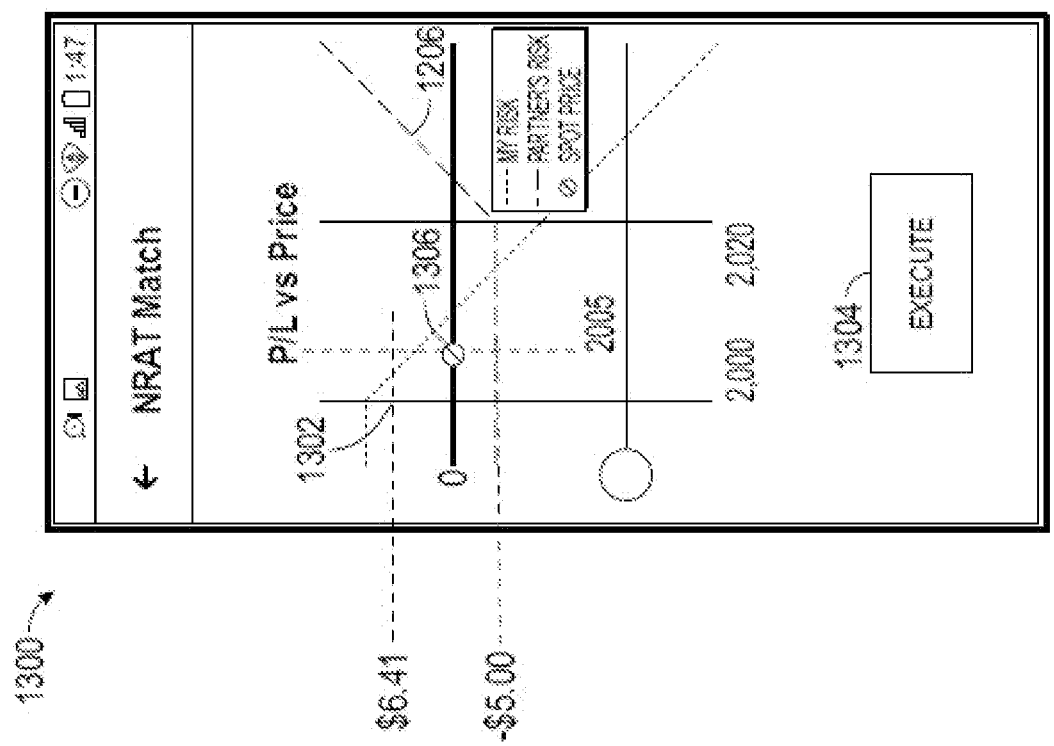
FIG. 11 is an exemplary computer-implemented display illustrating both legacy payoffs for the trading scenario illustrated in FIGS. 9 and 10.

Referring now to FIGS. 11 and 12, the respective display 1300, 1400 on each of the clients' 202, 222 GUI screens is illustrated, corresponding to the current step in the sequence of steps that may be requisite to consummating the trade using the NASH app 208. FIG. 11 illustrates an exemplary display 1300 for client 202 providing the first user a choice of selecting an EXECUTE 1304 button, thereby instructing the app 208 to instruct the NASH Platform 206 to execute the trade through API 212 and/or exchange 216 using network 204 for data communication. If button 1304 is selected by client 202, then it is understood that client 202 is accepting the complementary position 1206 of client 222. This means that NASH Trade Platform 206 may now proceed to execute instructions/script to coalesce the complementary opposing client 222 position (namely, asset 702, having payoff function depicted by 1206), with client 202 position (namely, asset 502, having payoff function depicted by 1106).

FIG. 12 illustrates an exemplary display 1400 for client 222 providing the second user a choice of selecting an EXECUTE 1402 button, thereby instructing the app 208 to instruct the NASH Platform 206 to execute the trade through API 212 and/or exchange 216 using network 204 for data communication. If button 1402 is selected by client 222, then it is understood that client 222 is accepting the complementary position 1106 of client 202. This means that NASH TRADE Platform 206 may now proceed to execute instructions/script, in accordance with the present invention's sharing of risk and reward operating principle, to coalesce the complementary opposing client 202 position, namely, asset 502, having payoff function depicted by 1106, with client 222 position, namely, asset 702, having payoff function depicted by 1206.

At this point, the net result of the interaction between the clients 202 and 222 and the platform 206 may now produce the corresponding payoff functions for the disparate parties using clients 202, 222 by executing the present invention through the algorithms running on 206 and providing the output to clients 202, 222 through their respective apps 208.

Figure 14:
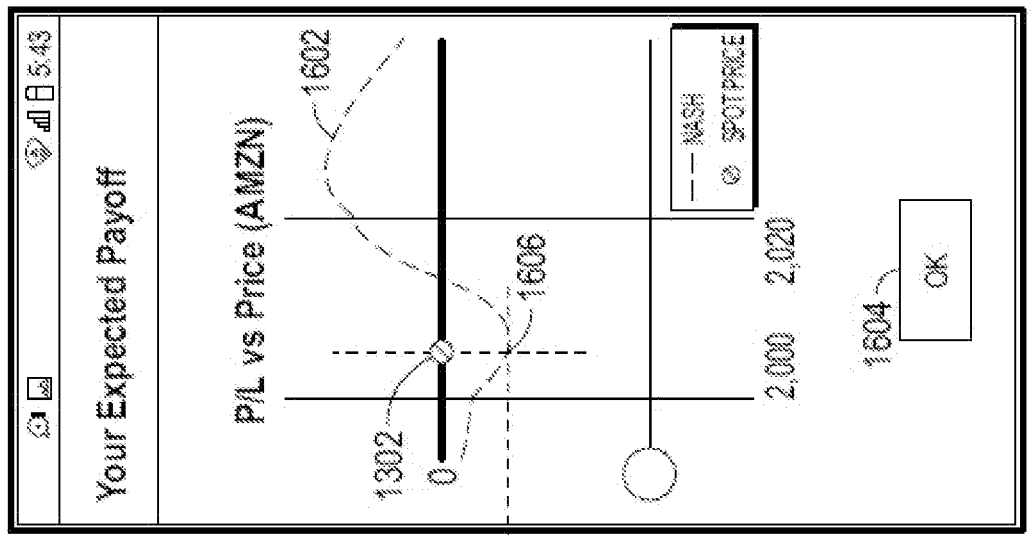
FIG. 14 is an exemplary computer-implemented display illustrating a play terminal payoff function resulting from a non-constant level of sharing choice for the trading scenario illustrated in FIGS. 9 and 10.
Figure 13:
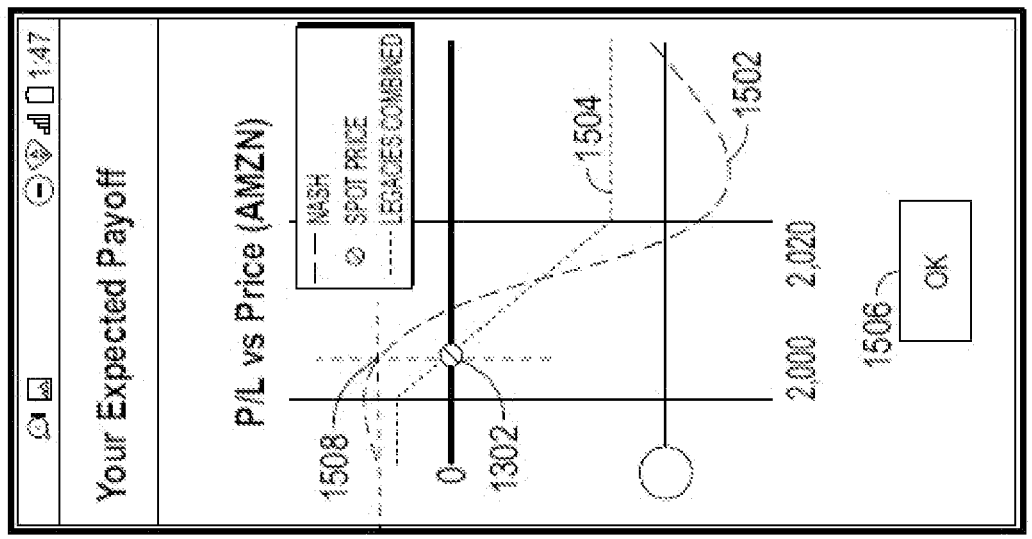
FIG. 13 is an exemplary computer-implemented display illustrating a play terminal payoff function resulting from a non-constant level of sharing choice for the trading scenario illustrated in FIGS. 9 and 10.

Referring now to FIGS. 13 and 14, the respective display 1500, 1600 on each of the clients' 202, 222 GUI screens is illustrated, corresponding to the current step in the sequence of steps that may be requisite to consummating the exemplary trade using the NASH app 208 executing through the platform 206. FIG. 13 illustrates the payoff function 1502 may be the expected NASH payoff curve that client 202 is agreeing to, where this terminal payoff function may correspond to the chosen α of this exemplary combined trade. In other words, payoff function 1502 may therefore be the NASH payoff that may result once client 202 selects EXECUTE 1304 to commence the present invention's functionality.

Furthermore, the payoff curve 1504 may correspond to client 202 payoff if client 202 elects to buy asset 702 with corresponding payoff curve 1206, along with selling asset 502 with corresponding payoff curve 1106. In other terms, payoff 1504 may be the Legacy payoff that may result when client 202 plays as a "lone trader" and both Sells 502 and Buys 702 so that the net play is that of a credit call spread (a product that is routinely traded on exchanges). More precisely, payoff 1504 illustrates an exemplary legacy payoff curve that may result from vertically summing the offsetting asset payoff curve 1106 of the asset 502, and the asset 702 payoff curve 1206. Client 202 may now select 1506 OK to receive the next display.

FIG. 14 illustrates the payoff function 1602 and, in this example, is the expected NASH payoff curve that client 222 is agreeing to as the ultimate P/L payoff curve. That is, the NASH payoff 1602 may result once client 222 selects 1402 from FIG. 12 to commence the functionality of the present invention. Client 222 may now select 1604 OK to receive the next display.

Figure 16:
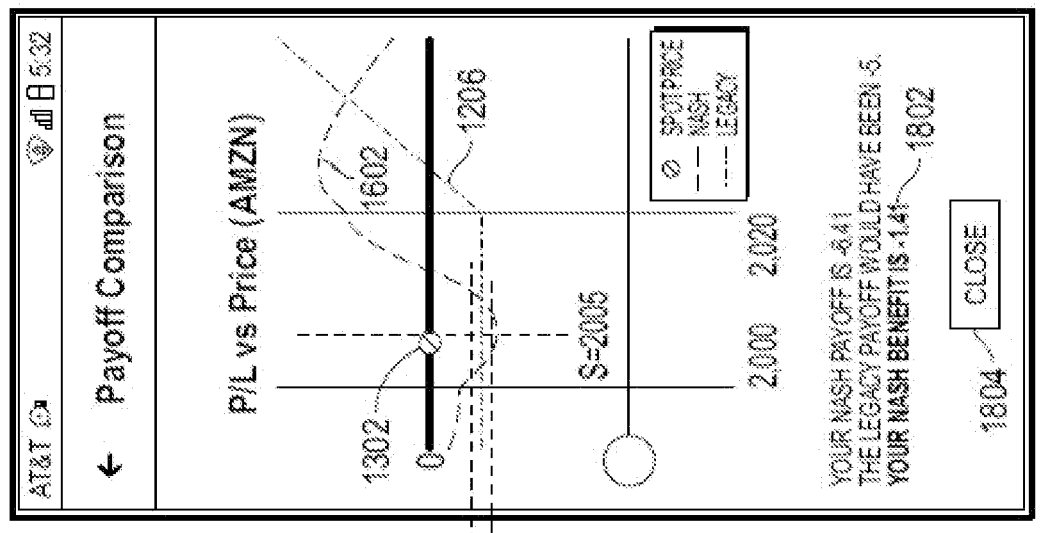
FIG. 16 is an exemplary computer-implemented display illustrating a corresponding payoff comparison for a non-linear play versus legacy play for the trading scenario illustrated in FIGS. 9 and 10.
Figure 15:
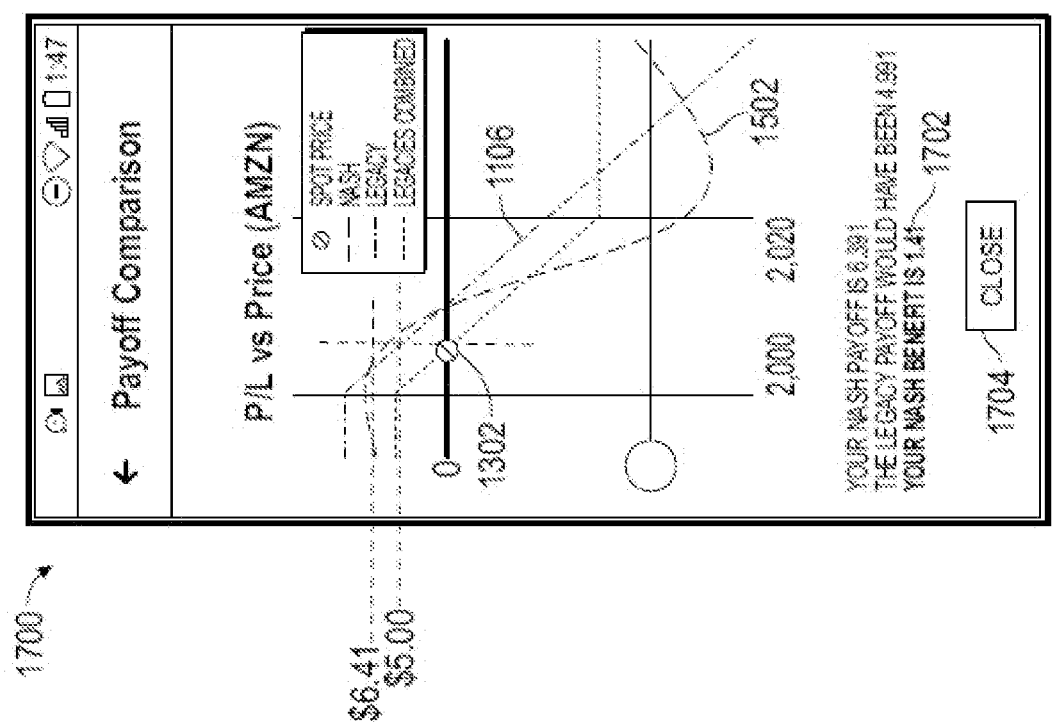
FIG. 15 is an exemplary computer-implemented display illustrating a corresponding payoff comparison for a non-linear play versus legacy play for the trading scenario illustrated in FIGS. 9 and 10.

Referring now to FIGS. 15 and 16, the respective display 1700, 1800 on each of the clients' 202, 222 GUI screens is illustrated, corresponding to the current step in the sequence of steps that may be requisite to consummating the trade using the NASH app 208. FIG. 15 shows the last computer-implemented display 1300 of the GUI embodiment that may facilitate the execution of the present invention, wherein the terminal stock price 1302 indicated by the disk may determine the NASH benefit 1702 to client 202 as a result of coalescing asset 502 having payoff curve 1106 with client 222 opposing asset 702 having payoff curve 1206. Selecting button 1704 may return client 202 to portfolio screen 500.

Similarly, FIG. 16 illustrates the last computer-implemented display 1300 of the GUI embodiment that may facilitate the execution of the present invention, wherein the terminal stock price 1302 indicated by the disk may determine the NASH benefit 1802 to client 222 as a result of coalescing asset 702 having payoff curve 1206 with client 202 opposing asset 502 having payoff curve 1106. Selecting button 1804 may return client 222 to portfolio screen 700.

Figure 17:
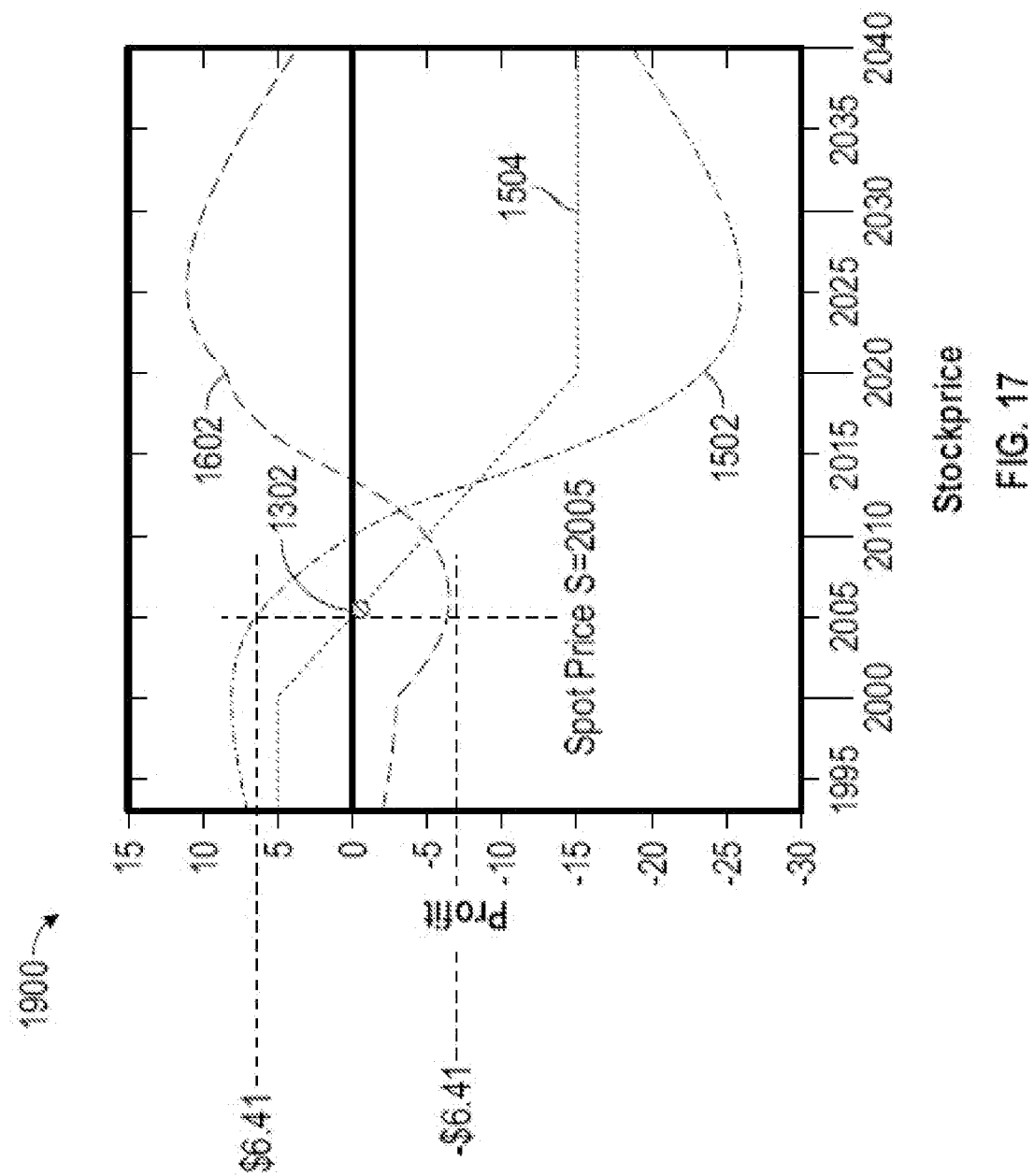
FIG. 17 a graph illustrating complementary non-linear payoff functions summing vertically to a legacy play for the trading scenario illustrated in FIGS. 11 through 16.

FIG. 17 summarizes for illustration purposes the sum total of the trade described through FIGS. 3 through 16 above. More precisely, for the corresponding level of sharing α, the graph 1900 displays the payoff function 1502 for client 202 for selling asset 502, and the corresponding resulting payoff function 1602 for client 222 for buying asset 702, as well as the vertical sum 1504 of the payoffs 1502 and 1602, resulting in the net payoff between the two traders that is nothing more than the Legacy trade (Credit Call Spread in this case) that may result if either trader was trading alone and thus assumed both positions involving asset 502 and asset 702. The sum of both payoffs 1502 and 1602 in FIG. 17, by design of the present invention, may always add up vertically to produce the Legacy payoff that may result if either trader was trading alone and thus assuming both positions involving asset 502 and asset 702. Therefore, the legacy profile may be a FINRA or, more generally, a stock exchange approved trade. Furthermore, FIG. 17 illustrates the power and flexibility that the present invention affords the disparate traders in selecting their own corresponding payoff functions and is an example of a non-constant sharing level alpha (α).

Given the enormous number of different financial products available on exchanges, the present invention's potential to advantageously mitigate risk and reward between two traders of these financial products is at least as numerous. Moreover, owing to the flexibility of allowing a trader to deviate from the Legacy payoffs by coalescing with another trader who desires to do the same as explained above, the invention advantageously may produce virtually infinitely many pairs of non-legacy payoffs, where the pairs' sum is always a Legacy payoff.

FIGS. 18 through 21 are analogues of FIG. 17 in that each summarizes what would happen if the sequence of steps described for FIGS. 3 through 16 was repeated using different sharing levels.

Figure 18:
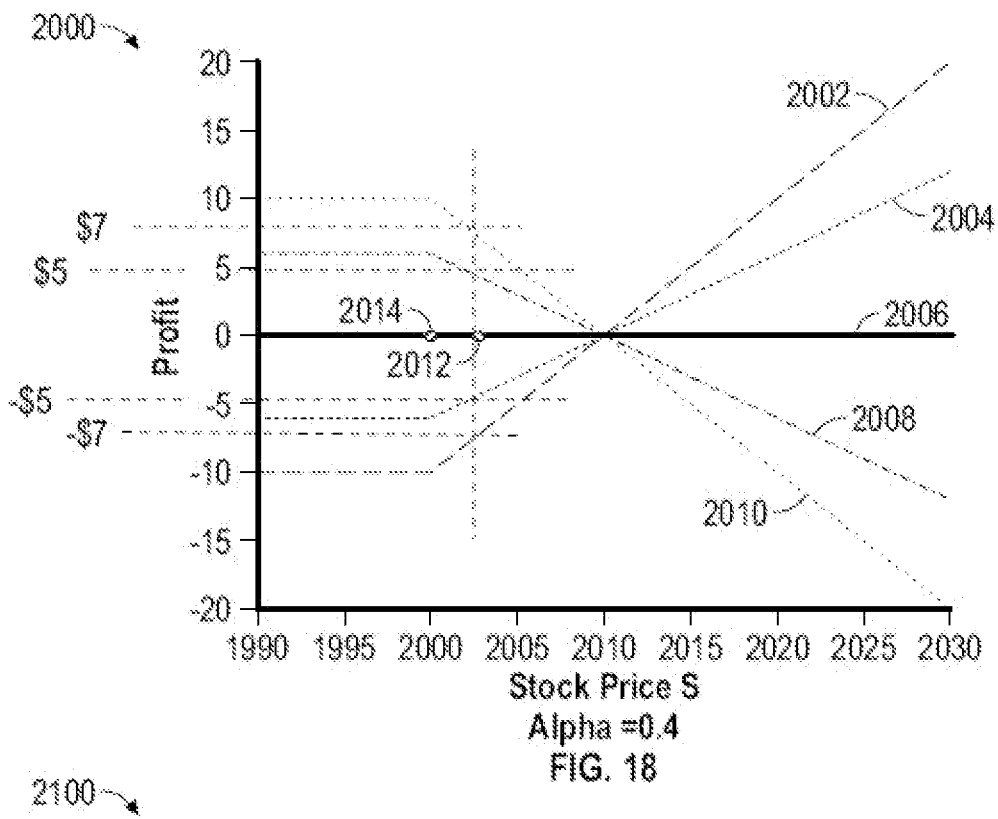
FIG. 18 is a graph illustrating linear or constant sharing level payoffs, corresponding individual legacy payoffs, and vertical sum-total of corresponding payoffs for the trading scenario illustrated in FIGS. 11 through 16.

In the example scenario of FIG. 18, graph 2000 displays a payoff function 2008 for a user of client 202, and the corresponding resulting payoff function 2004 for another user of client 222, as well as the vertical sum of these that results in net payoff 2006 between the two traders 202, 222. More precisely, graph 2000 displays the NASH payoff function 2008 for selling asset 2010, and the corresponding resulting payoff function 2004 for client 222 for buying asset 2002, both with the same strike price 2014; as well as the vertical sum 2006 of the payoffs 2008 and 2004. Note that both sums result in the net payoff between the two traders that is the Legacy trade payoff (a Call "Spread" in this case) that would result if either trader was trading alone and thus assumed both positions 2010 and asset 2004 (in this special case, the net return is "zero net" 2006). Further, this figure illustrates an example of a constant sharing level α, and the corresponding payoff functions emerging from this choice.

Figure 19:
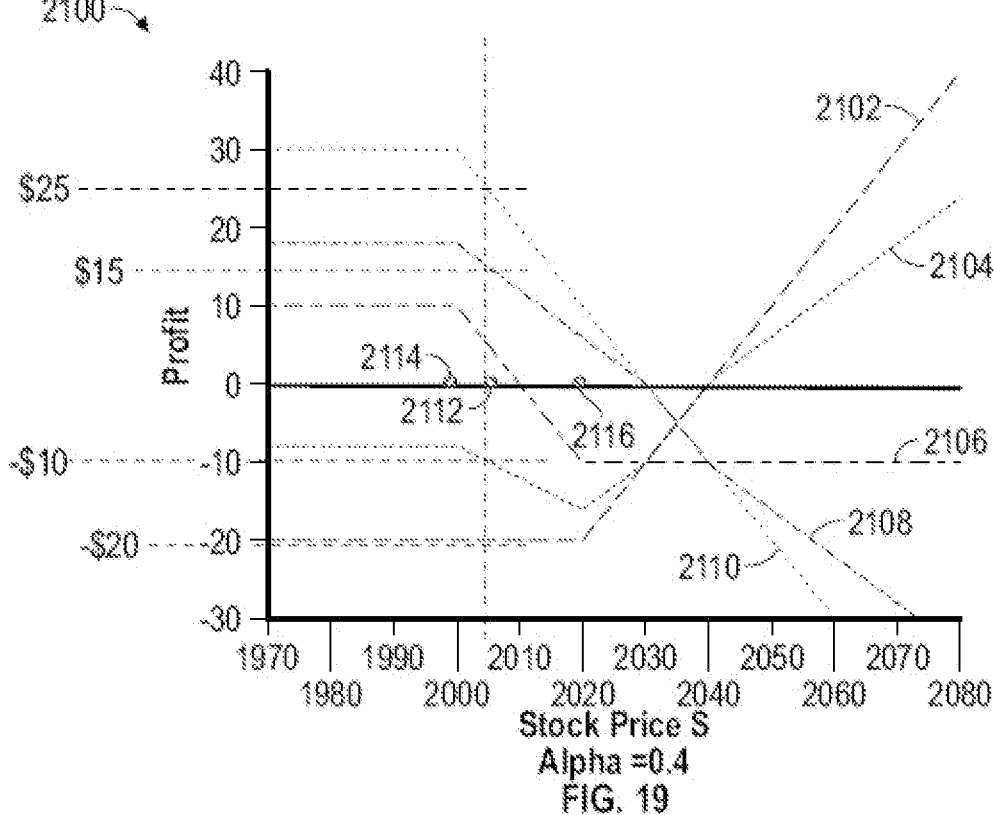
FIG. 19 is a graph illustrating, for the case of different strike prices, the linear or constant sharing level payoffs, the corresponding individual legacy payoffs, and vertical sum-total of the corresponding payoffs for the trading scenario illustrated in FIGS. 11 through 16.

In the example scenario of FIG. 19, graph 2100 displays a payoff function 2108 for a user of client 202, and the corresponding resulting payoff function 2104 for another user of client 222, as well as the vertical sum of these that results in the net payoff 2106 between the two traders 202, 222. More precisely, graph 2100 displays the payoff function 2108 for selling asset 2110, and the corresponding resulting payoff function 2104 for client 222 for buying asset 2102, with their strike prices 2114 and 2116 respectively; as well as the vertical sum 2106 of the payoffs 2108 and 2104. Note that both sums result in the net payoff between the two traders that is the Legacy trade payoff (a Credit Call "Spread" in this case) that would result if either trader was trading alone and thus assumed both positions 2110 and asset 2102, namely the Legacy payoff 2106. Further, this figure illustrates an example of a constant sharing level α, with differing strikes prices 2114 and 2116 and the corresponding payoff functions emerging from these parameter values.

Figure 20:
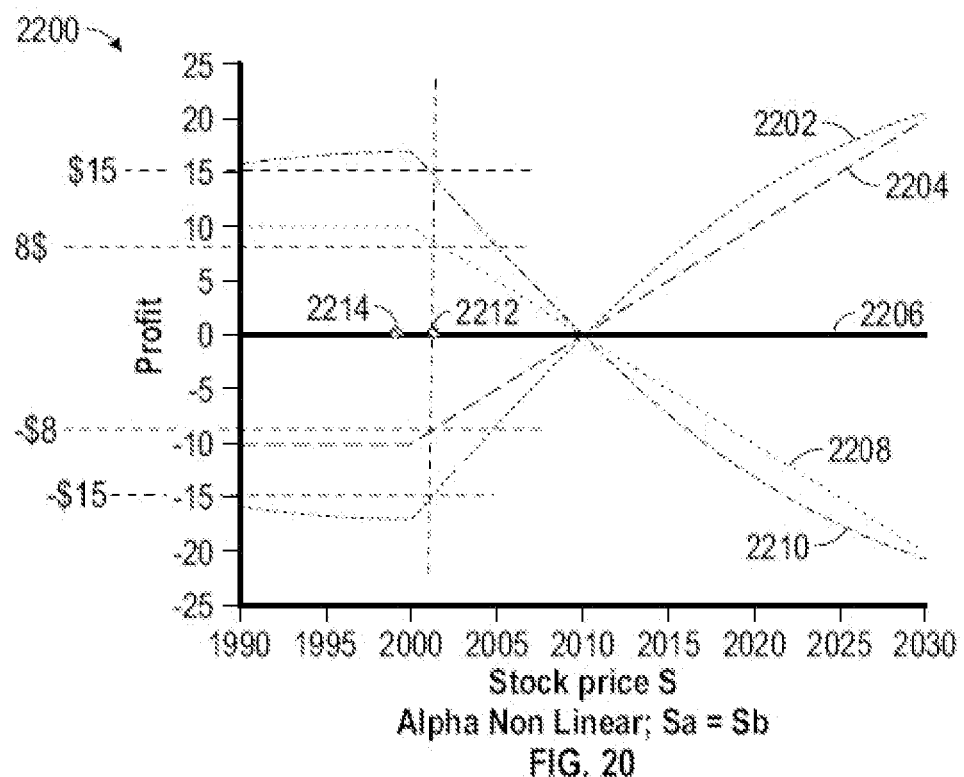
FIG. 20 is a graph illustrating, for the case of same strike prices and a non-constant sharing level, the non-linear payoffs, the corresponding individual legacy payoffs, and vertical sum-total of the corresponding non-linear payoffs for the trading scenario illustrated in FIGS. 11 through 16.

In the example scenario of FIG. 20, graph 2200 displays a payoff function 2210 for a user of client 202, and the corresponding resulting payoff function 2202 for another user of client 222, as well as the vertical sum of these that results in the net payoff 2206 between the two traders 202, 222. More precisely, graph 2200 displays the payoff function 2210 for selling asset 2208, and the corresponding resulting payoff function 2202 for client 222 for buying asset 2204, with their strike price 2214 the same; as well as the vertical sum 2206 of the payoffs 2210 and 2202. Note that this sum results in the net payoff between the two traders that is the Legacy trade payoff (a Credit Call "Spread" in this case) that would result if either trader was trading alone and thus assumed both positions 2208 and asset 2204, namely the Legacy payoff 2206. Further, this figure illustrates an example of a non-constant sharing level α, with same strikes prices 2214 and the corresponding payoff functions emerging from these parameter values. The level of sharing α is non-constant here in the sense that it is dependent on the underlying spot price S, and as graph 2200 demonstrates, allows for novel and unique payoff functions 2202 and its match 2210 that vertically sum to the Legacy 2206.

Figure 21:
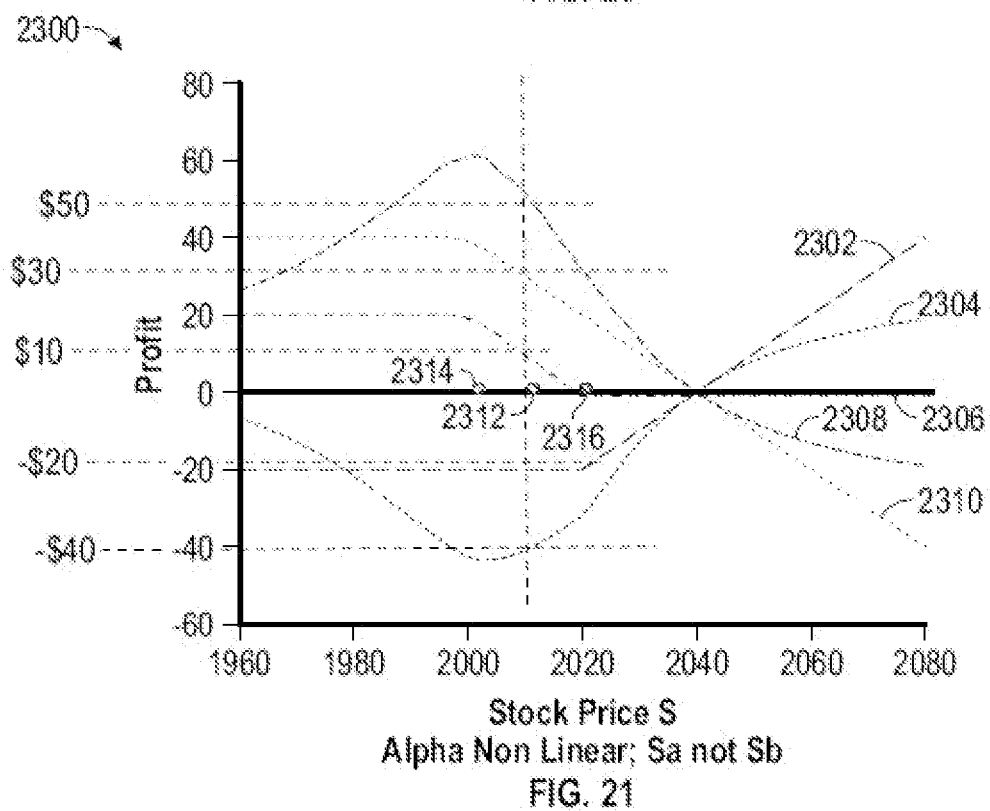
FIG. 21 is a graph illustrating, for the case of different strike prices and a non-constant sharing level, the non-linear payoffs, the corresponding individual legacy payoffs, and vertical sum-total of the corresponding non-linear payoffs for the trading scenario illustrated in FIGS. 11 through 16.

In the example scenario of FIG. 21, graph 2300 displays a payoff function 2308 for a user of client 202, and the corresponding resulting payoff function 2304 for another user of client 222, as well as the vertical sum of these that results in the net payoff 2306 between the two traders 202, 222. More precisely, graph 2300 displays the payoff function 2308 for selling asset 2310, and the corresponding resulting payoff function 2304 for client 222 for buying asset 2302, with their strike price 2314 and 2316 not equal; as well as the vertical sum 2306 of the payoffs 2308 and 2304. Note that this sum results in the net payoff between the two traders that is nothing more than the Legacy trade payoff (a Credit Call "Spread" in this case) that would result if either trader was trading alone and thus assumed both positions 2310 and asset 2302, namely the Legacy payoff 2206. Further, this figure illustrates an example of a non-constant sharing level a with non-equal strikes prices, and the corresponding payoff functions emerging from these parameter values. The level of sharing α is non-constant here in the sense that it is dependent on the underlying spot price S, and as graph 2300 demonstrates, allow for novel and unique payoff functions 2308 and its match 2304 that vertically sum to the Legacy 2306.

The above FIGS. 17 through 21 each illustrate the power and flexibility that the present invention affords disparate traders in selecting their own corresponding payoff functions. These figures represent a small number of exemplary trades possible with the present invention, and exemplify the capability of using different sharing schemes via the type and choice of sharing level α. In each of the figures, the sum of both payoffs for the client 202, 222 pair adds up vertically to produce the Legacy payoff that would result if either trader was trading alone and thus assumed both positions involving the short asset (like 502) and the long asset (like 702). Moreover, owing to the flexibility of allowing a trader to deviate from the Legacy payoffs, by coalescing with another trader who desires to do the same as explained above, the present invention may advantageously produce virtually any pair of non-legacy payoffs, where a pairs' sum is a corresponding Legacy payoff.

Figure 22:
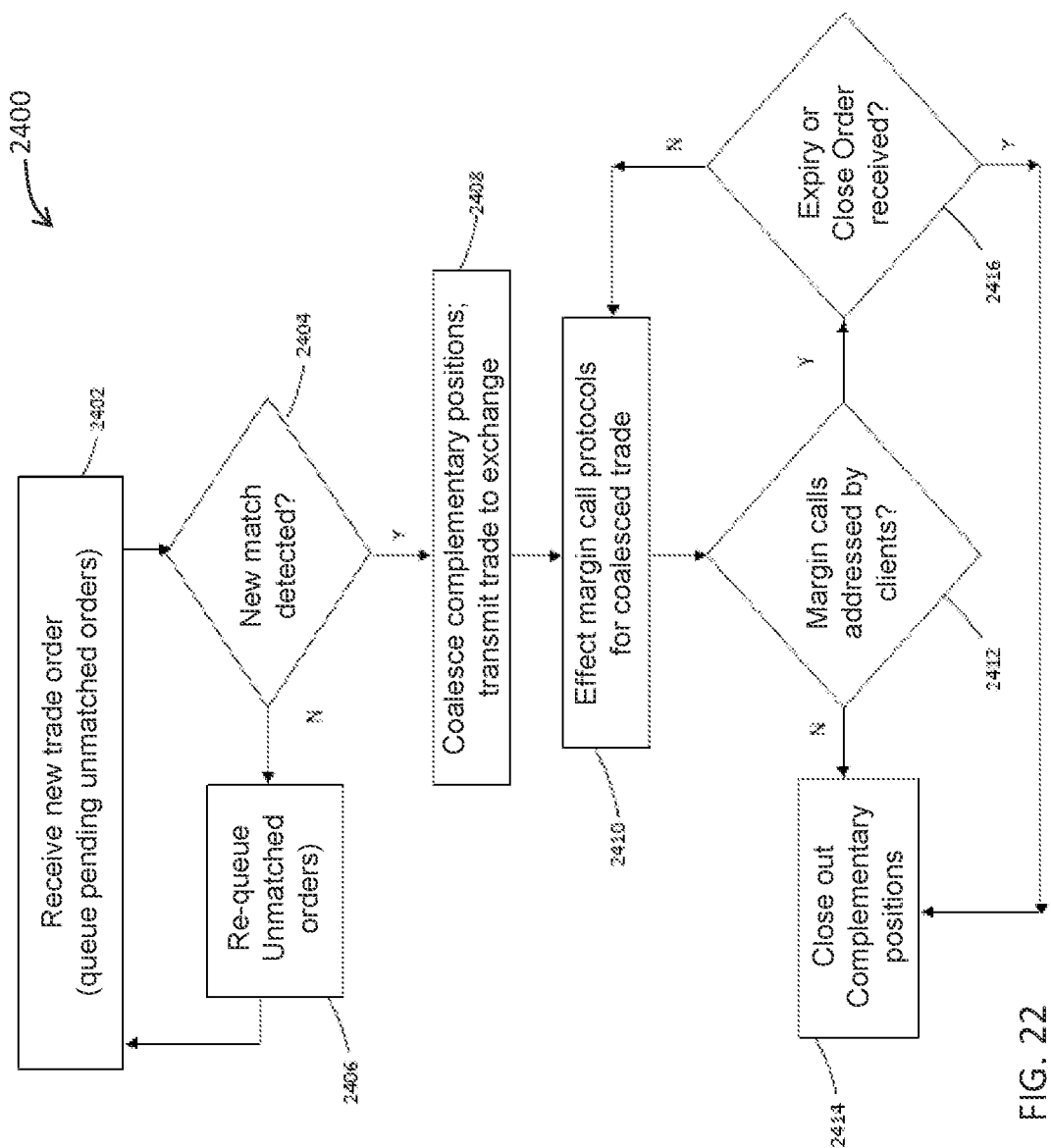
FIG. 22 is a flow chart of trading steps using an exemplary counter-party trader social networking service system according to an embodiment of the invention.

FIG. 22 illustrates at a higher level of abstraction the logical flow 2400 of the steps that may execute a trade in accordance with one or more embodiments of the invention (more specifically, a sequence of steps internal to server component 206 of FIG. 2 wherein the execution of the script may accomplish risk and reward coalescing of complementary positions as per the example scenarios described hereinabove).

Beginning at step 2402, the hardware and software script of the present invention may receive orders from clients 202, 222, as well as may record pending unfilled orders in a queue. Such orders may be received and/or stored in the form of a trade transaction record. For example, and without limitation, each trade transaction record may be formatted for processing by a commercially available exchange 216. In step 2404, the trading platform algorithms may perform a matching task for incoming as well as pending or unfilled orders, and a decision of whether an appropriate match is available for the new incoming orders vis-à-vis the unfilled orders may be made. For example, and without limitation, matching of orders may be based on each order originator's respective election of desired level of sharing, α. At step 2406, if no current match is detected for the new or unfilled orders of step 2402, the orders (that is, trade transaction records) without a corresponding matching complementary order (that is, counter-trade transaction record) may be returned to the queue for ongoing processing at step 2402. At step 2408, if a current match (for example, a complementary risk correlation of a trade sharing level election and a counter-trade sharing level election) for the new or unfilled orders of step 2402 is detected, the order(s) with a corresponding matching complementary order (that is, a coalesced order transaction record formed from the trade transaction record and the counter-trade transaction record) may then be executed via the distributed hardware/software architecture executing the present invention's functionality described hereinabove.

Step 2410 indicates that, after the consummation of a trade involving matching complementary positions between disparate traders as in step 2408, the coalesced positions (transaction records) are subsequently managed internally by the trading platform 206 executing the present invention. In particular, the positions may be constantly monitored in real time for the purpose of making adjustments and/or in-house margin calls that may be required to guarantee that the platform may close the positions when an order to close an open coalesced trade is placed by either or both of clients 202, 222 (per step 2416) and received by the platform server 206. Further, at this step 2410, the present invention executing its margin trigger test continuously (see appendix I(a) for mathematical detail of this margin call trigger) in real time to determine if additional margin funds are required to maintain the coalesced positions. If no additional margin funds are required per step 2412, the positions may persist (per step 2416) until a closing order by either or both of clients 202, 222, or until the expiration (if any) of the underlying positions (as in expiration of a derivative on an underlying asset for example).

If, on the other hand, in Step 2410 additional margin requirements are determined as needed, a call for additional margin funds must be addressed by client 202 and/or client 222 depending on the type of sharing between these traders and the underlying asset's stochastic or random market changes (i.e., the underlying spot price for example). If the margin call is not addressed (per step 2412) in a timely manner, then step 2414 indicates that the trading platform will close the coalesced trade. If the margin call is addressed, then the coalesced positions continue to be monitored until additional funds are required again and/or until order expiration or closure per step 2416.

Example coalesced trade scenarios 1 through 5 described below make direct reference to FIGS. 3 through 22, and each represent one of a large number of possible trading plays and, in particular, involve assets like asset 502 and offsetting assets like asset 702 depicted in portfolio screens 500 and 700 respectively.

In particular, for the example scenarios to follow, FIGS. 3 through 17 address the steps required to consummate a call spread using the NASH app 208 and involve two derivative legs: specifically, client 202 sells one Call contract while Client 222 buys one (offsetting) complementary Call contract with the same underlying asset.

The strike prices of the derivatives are the same for Examples 2 and 4 below; while the strike prices of Example 1, Example 3, and Example 5 are not the same.

The payoff functions for clients 202, 222 are linear for Examples 2 and 3, and non-linear for Examples 1, 4, 5.

The underlying asset in all five Examples is AMZN (Amazon) stock, and there are 100 AMZN shares underlying each Short Call contract (client 202), and complementarily 100 AMZN shares underlying each Long Call contract (client 222).

For the purpose of facilitating the Examples' simplicity of illustration, there is one Call contract shorted (sold) by client 202, and its corresponding offsetting one long Call Contract (bought) by client 222.

The number of contracts is irrelevant to the purpose of illustrating the present invention's functionality, as is the underlying asset, as well as the type of derivative involved.

The initial premiums on the short Call position of client 202 and the initial cost on the long Call position of client 222 vary from example to example.

A person skilled in the art would know that the examples presented are merely for illustration purpose and go to the point of coalescing of disparate opposing positions for the purpose of risk mitigation and financial gain.

The general mathematical structure of the payoff functions is described in appendix I(a), and therefore the Examples described herein are for exemplary purpose only, while the method described herein describes how to construct any payoff function pair.

Example 1

This example will make specific references to FIGS. 3 through 17.

In this example the level of sharing, $\alpha$, is non-constant and non-linear in the sense of being "non-linearly dependent" on the underlying strike prices $S_A$, $S_B$ as well as the spot price S, and the time, t, that has elapsed since the coalescing of the two positions of clients 202, 222 was initiated using the present invention.

A person skilled at the art would recognize that there are infinitely many sharing-functions $\alpha$ possible, and only one is used in this example. This particular $\alpha$ is used to generate the payoff function 1502 of FIG. 13 and its corresponding complementary opposite payoff function 1602 of FIG. 14.

One plausible mathematical form for the two payoffs for clients 202, 222, FIG. 13, payoff 1502, and FIG. 15, payoff 1702, is given in appendix I(b). Again, it should be noted that the sharing function $\alpha$, whether a constant or a variable, as in this example, represents the present invention's trading capability.

The Example discussed here begins when Client 202 selects the derivative asset 502 FIG. 4. Asset 502 of FIG. 4, has a legacy payoff function 1106 of FIG. 9, corresponding to AMZN $2000 strike price 1104 of FIG. 9, and expiration 504 (January 10) of FIG. 4. The legacy-premiums collected, 1110 of FIG. 9, for selling this call, with a $2000 strike price 1104 of FIG. 9, is $10.00, as indicated in FIG. 9. Client 202's resulting non-linear NASH payoff function 1502, FIG. 13, is then a consequence of the non-linear a sharing. See Appendix I(b) for mathematical definition of payoff involved here.

Client 222 in turn selects asset 702 in FIG. 5. Asset 702 has a legacy payoff function 1206 of FIG. 10, corresponding to AMZN $2020 strike price 1204 of FIG. 10, and expiration 704 of FIG. 5. The legacy-premiums collected (cost to client 222), 1210 of FIG. 10, for buying this call with a $2020 strike price 1204 of FIG. 10, is –$5.00, as indicated in FIG. 10.

Suppose for this example that, when the NASH game ends, the spot price 1302 of FIG. 11 is $2005.

a. Client 202 receives $6.41; this is indicated by the intersection 1508 of FIG. 13 of the vertical line through the spot price 1302 of FIG. 13, and client 202 non-linear payoff function 1502.

b. Client 222 receives –$6.41; this is indicated by the intersection 1606 of FIG. 14, of the vertical line through the spot price 1302 of FIG. 14, and client 222 non-liner payoff function 1602 of FIG. 14.

c. Client 202 NASH benefit is $1.41 since at the spot price 1302 of $2005, FIG. 15, the nonlinear-payoff 1502, FIG. 15, indicates $6.41 payoff, while Legacy payoff 1106 would have resulted in a $5.00 payoff. Client 202: Nash Payoff–Legacy Payoff=$6.41–$5.00=$1.41 d. Client 222 Nash benefit is −$1.41 since at the spot price 1302 of $2005, FIG. 16, the nonlinear-payoff 1602, FIG. 16, indicates a −$6.41 payoff, while Legacy payoff 1206, would have resulted in a −$5.00 payoff. Client 222: Nash Payoff−Legacy Payoff=−$6.41−(−$5)=−$1.41

Example 2

This example is based on FIG. 18 and all the items labeled therein.

In this example, the level of sharing is constant. More precisely, $\alpha$=0.6; that is, it is constant, in the sense of being independent of both the underlying strike price and time and is agreed upon by both client 202 and 222 at the initiation of the NASH credit call contract.

As noted earlier in Example 1, there are infinitely many sharing functions $\alpha(S,t)$ possible; only one is described in this Example, specifically $\alpha(S,t)$=0.6.

This sharing, whether at a constant level, alpha, as in this Example 2, is only one specific example of the present invention's trading capability and flexibility.

One plausible mathematical form for the two payoffs for clients 202, 222, FIG. 18, payoff 2008, and FIG. 18, payoff 2004, respectively, is given in the Appendix I(b). The Example discussed here begins when Client 202 selects asset 502 of FIG. 4. Asset 502 of FIG. 4, has a legacy payoff function 2010 of FIG. 18, corresponding to AMZN $2000 strike price 1104 of FIG. 9, and expiration 504 (January 10) of FIG. 4. The initial legacy-premiums collected, 2010 of FIG. 18, for selling this call, with a $2000 strike price 2014 of FIG. 18, is $10.00, as indicated in FIG. 18. Client 202's resulting NASH payoff function 2008 of FIG. 18, is then a consequence of the linear alpha sharing, or NASHing level.

Client 222 in turn selects asset 502 in FIG. 4. Client 222 buys this derivative asset, in contrast to client 202 who sold the derivative asset. Asset 502, when bought, has a legacy payoff function 2002 of FIG. 18, corresponding to AMZN $2000 strike price, 2014 of FIG. 18, for this long call position. The initial legacy-premiums paid for buying this call with a $2000 strike price 2014 of FIG. 18, is −$10.00, as indicated in FIG. 18. Suppose that, when the NASH game ends, the spot price 2012 of FIG. 18, is $2002.50.

a. Client 202 receives $7.00; this is indicated by the intersection of the vertical line through the spot price 2012 of FIG. 18, and client 202 linear NASH payoff function 2008 of FIG. 18.

b. Client 222 receives −$5.00; this is indicated by the intersection, of the vertical line through the spot price 2012 of FIG. 18, and client 222 liner payoff function 2004 of FIG. 18.

c. Client 202 NASH benefit is −$2, since at the spot price, 2012 of $2000, FIG. 18, the linear-legacy payoff, 2010 of FIG. 18, indicates a $7 payoff, while the corresponding NASH payoff 2008 results in a $5.00 payoff. Client 202 NASH benefit: Nash Payoff−Legacy Payoff=$5−$7=−$2 d. Client 222 Nash benefit is $2, since at the spot price, 2012, $2000 of FIG. 18, the linear-legacy payoff, 2002 of FIG. 18, indicates a −$7 payoff, while the corresponding NASH payoff 2004, results in a −$5.00 payoff. Client 222 NASH benefit: Nash Payoff−Legacy Payoff=−$5−(−$7)=$2

Example 3

This example is based on FIG. 19 and all the items labeled therein.

In this Example the level of sharing, alpha=0.6, is constant, in the sense of being independent of both the underlying strike price and time and preset at the initiation of the NASH credit call contract. There are infinitely many sharing functions $\alpha(S,t)$ possible; only one is described in this example, specifically $\alpha(S,t)$=0.6. This sharing, whether at a constant level, alpha, as in this Example 2, or not, as in the previous Example, is only one specific embodiment of the present invention's trading capability and flexibility.

One plausible mathematical form for the two payoffs for Clients 202, 222, FIG. 19, payoff 2108, and FIG. 19, payoff 2104, respectively, is given in the Appendix I(b). The Example discussed here begins when Client 202 selects asset 502 of FIG. 4. Asset 502 of FIG. 4 has a legacy payoff function 2110 of FIG. 19, corresponding to AMZN $2000 strike price 1104 of FIG. 9, and expiration 504 (January 10) of FIG. 4. The initial legacy-premiums collected, 2110 of FIG. 19, for selling this call, with a $2000 strike price 2114 of FIG. 19, is $30.00, as indicated in FIG. 19. Client 202's resulting NASH payoff function 2108 of FIG. 19 is then a consequence of the linear alpha sharing, or NASHing level.

Client 222 in turn selects asset 702 in FIG. 5. Asset 702 of FIG. 5 has a legacy payoff function 2102 of FIG. 19, corresponding to AMZN $2020 strike price 2114 of FIG. 19, for this long call position. The legacy-premiums collected for buying this call with a $2020 strike price 2014 of FIG. 19, is −$20.00, as indicated in FIG. 19. Suppose that, when the NASH game ends, the spot price, 2112 of FIG. 19, is $2005.

a. Client 202 receives $15.00; this is indicated by the intersection of the vertical line through the spot price 2112 of FIG. 19, and client 202 liner NASH payoff function 2108 of FIG. 19.

b. Client 222 receives −$10.00; this is indicated by the intersection of the vertical line through the spot price 2112 of FIG. 19, and client 222 liner payoff function 2104 of FIG. 19.

c. Client 202 Nash benefit is −$10, since at the spot price 2112 of $2010 of FIG. 19, the linear-legacy payoff, 2110 of FIG. 19, indicates a $25 payoff, while the corresponding NASH payoff 2108 results in a $15.00 payoff. Client 202 NASH benefit: Nash Payoff−Legacy Payoff=$15−$25=−$10 d. Client 222 Nash benefit is $10, since at the spot price, 2112 of $2010 of FIG. 19, the linear-legacy payoff, 2102 of FIG. 19, indicates a −$20 payoff, while the corresponding NASH payoff 2104 results in a −$10.00 payoff. Client 222 NAS benefit: Nash Payoff−Legacy Payoff=−$10−(−$20)=$10

Example 4

This Example is based on FIG. 20 and all the items labeled therein.

In this Example the level of sharing, $\alpha(S,t)$ is non-constant, in the sense of being dependent, on both the underlying strike price S, and time, t and is chosen, and agreed upon, by both clients 202 and 222, at the initiation of the NASH credit call contract of this Example 4.

There are infinitely many sharing functions $\alpha(S,t)$ possible, only one is described in this Example. This non-linear sharing profit/loss function $\alpha(S,t)$, is only one specific payoff possible with embodiment of the present invention's trading capability and flexibility.

One plausible mathematical form for the two payoffs for clients 202, 222 of FIG. 20, payoff 2208, and FIG. 20, payoff 2204, respectively, is given in the Appendix I(b).

The Example discussed here begins when Client 202 selects asset 502 of FIG. 4. Asset 502 of FIG. 4 has a legacy payoff function 2210 of FIG. 20, corresponding to AMZN $2000 strike price 1104 of FIG. 9, and expiration 504 (January 10) of FIG. 4. The legacy-premiums collected, 2208 of FIG. 20, for selling this call, with a $2000 strike price 2214 of FIG. 20, is $10.00, as indicated in FIG. 20. Client 202's resulting NASH payoff function 2210 of FIG. 20 is then a consequence of the non-linear a (S,t) sharing, or NASHing level.

Client 222 in turn selects asset 502 in FIG. 4. Asset 502 has a legacy payoff function 2204 of FIG. 20, corresponding to AMZN $2000 strike price, 2214 of FIG. 20, for this long call position.

The initial legacy-premiums paid by client 222, FIG. 20, for buying this call with a $2000 strike price 2214, FIG. 20, is –$10.00, as indicated in FIG. 20. Suppose that, when the NASH game ends, the spot price, 2212 of FIG. 20, is $2001.

a. Client 202 receives $15.00; this is indicated by the intersection of the vertical line through the spot price 2212 of FIG. 20, and client 202 non-liner NASH payoff function 2210 of FIG. 20.

b. Client 222 receives –$15.00; this is indicated by the intersection of the vertical line through the spot price 2212 of FIG. 20, and client 222 nonlinear payoff function 2202 of FIG. 20.

c. Client 202 NASH benefit is $7, since at the spot price, 2212 of $2000 of FIG. 20, the linear-legacy payoff, 2208 of FIG. 20, indicates a $8 payoff, while the corresponding NASH payoff 2208 results in a $15.00 payoff. Client 202 NASH benefit: Nash Payoff–Legacy Payoff=$15–$8=–$8 d. Client 222 Nash benefit is –$7, since at the spot price, 2212 of $2000 of FIG. 20, the linear-legacy payoff, 2202 of FIG. 20, indicates a –$8 payoff, while the corresponding NASH payoff 2202, results in a –$15.00 payoff. Client 222 NASH benefit: Nash Payoff–Legacy Payoff=–$15–(–$8)=–$7

Example 5

This example is based on FIG. 21 and all the items labeled therein.

In this Example the level of sharing, $\alpha(S,t)$ is non-constant, in the sense of being dependent, on both the underlying strike price S, and time, t, and it is chosen and agreed upon by both clients 202 and 222, at the initiation of the NASH credit call contract of this Example 5.

In addition, the strike price of the short call derivative 2314 of FIG. 21 is $2000, while the strike price 2316 of FIG. 21 of the long call derivative is $2020. There are infinitely many sharing functions $\alpha(S,t)$ possible, only one is described in this Example. This non-linear sharing profit/loss function $\alpha(S,t)$, is only one specific example of a payoff function possible with the embodiment of the present invention's trading capability and flexibility.

One plausible mathematical form for the two payoffs for clients 202, 222, FIG. 21, payoff 2308, and FIG. 21, payoff 2304, respectively, is given in the Appendix I(b).

The Example 5 discussed here begins when client 202 selects asset 502 of FIG. 4. Asset 502 of FIG. 4 has a legacy payoff function 2310 of FIG. 21, corresponding to AMZN $2000 strike price 1104 of FIG. 9, and expiration 504 (January 10) of FIG. 4. The legacy-premiums collected, $40, 2310 of FIG. 21, for selling this call, with a $2000 strike price 2314, as indicated in FIG. 21. Client 202's resulting NASH payoff function 2308 of FIG. 21 is then a consequence of the non-linear $\alpha(S,t)$ sharing, or NASHing level.

Client 222 in turn selects asset 702 in FIG. 5. Asset 702 has a legacy payoff function 2302 of FIG. 21, corresponding to AMZN $2000 strike price, 2316 of FIG. 21, for this long call position. The legacy-premiums collected are –$20.00, for buying this call with a $2020 strike price 2314 of FIG. 21, as indicated in FIG. 21. Suppose that, when the NASH game ends, the spot price, 2312 of FIG. 21, is $2010.

a. Client 202 receives $50.00; this is indicated by the intersection of the vertical line through the spot price 2312 of FIG. 21, and client 202 non-liner NASH payoff function 2308 of FIG. 21.

b. Client 222 receives –$40.00; this is indicated by the intersection, of the vertical line, through the spot price 2312 of FIG. 21, and client 222 nonlinear payoff function 2304 of FIG. 21.

c. Client 202 Nash benefit is $20, since at the spot price, 2312, $2010 of FIG. 21, the linear-legacy payoff, 2310 of FIG. 21, indicates a $30 payoff, while the corresponding NASH payoff 2308 results in a $50.00 payoff. Client 202: Nash Payoff–Legacy Payoff=$50–$30=$20 d. Client 222 Nash benefit is –$20, since at the spot price, $2010, 2312 of FIG. 21, the linear-legacy payoff, 2302 of FIG. 21, indicates a –$20 payoff, while the corresponding NASH payoff 2304, results in a –$40.00 payoff. Client 222: Nash Payoff–Legacy Payoff=–$40–(–$20)=–$20

A person of skill in the art will immediately recognize that any type of computer, such as a mainframe, minicomputer, or personal computer, or computer configuration, such as a timesharing mainframe, local area network, or standalone personal computer, may be used with the present invention.

More specifically, in some embodiments the method or methods described above may be executed or carried out by a computing system including a tangible computer-readable storage medium, also described herein as a storage machine, that holds machine-readable instructions executable by a logic machine (i.e., a processor or programmable control device) to provide, implement, perform, and/or enact the above-described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus, the scope of the invention should be determined by the appended claims and their legal equivalents, and not by the examples given.

APPENDICES

Appendix I(a)

Introduction to the Nash Risk Outsourcing Concept

Real trading in the real world through any platform executing trades on trade exchanges is often subject to regulatory margin requirements. These requirements are of two types: the first is from regulatory entities such FINRA in the USA, for example; and the second is of trade margin requirements and is internal to the particular trading platform. Both types are, however, in place to manage risk exposure to the trading platform, as well as to protect the trader.

The requirements placed by regulatory bodies, such as FINRA, are industry wide and are created by governmental agencies. These are not the main concern or subject of this appendix. Below we present an internal margin protocol that may facilitate trades through the proposed platform so that the present invention is viable in a real business sense.

Note, however, that the proposed internal margin protocols described below for typical trades to be executed utilizing the currents invention's risk and reward mitigation functionality are merely exemplary. That is, variations and modification of the margin protocol is readily achievable.

Embodiments of the present invention may include functionality that advantageously enables the internal coalescing (inside the platform's computer) of assets having opposing and complementary risk and reward outcomes.

More specifically, assets may be defined as complimentary in the sense that, when one asset is profitable, the coalesced asset is not and vice versa. Because this coalescing is achieved internally through the present invention's computer system, it follows that to the outside world (e.g., regulatory bodies of the global financial markets and exchanges), only the total net coalesced trade is visible. Significantly, the net coalesced sum of the disparate assets results in a total trade position that may be routinely traded on exchanges and/or through brokerages, therefore, this net trade automatically conforms to market regulations.

To illustrate exemplary internal mechanics that amount to a set of mathematical protocols described below, a small number of exemplary coalesced trades will now be described.

First, we focus on what is called a "Call Spread", where the first asset is a naked short call, while the second asset is a long call position on the same underlying asset. This coalesced trade will be illustrated for the case of same strike price for both derivative positions, and for the case of different strike prices for the two coalesced positions.

The Nash Out of the Money Short Call Execution Algorithm-Introduction

Below is described the algorithm specific to a Nash trade short credit call spread. This play is advantageous in that Nash_A is allowed to short the call "naked" without initially meeting the prohibitive legacy requirements for a naked call. This is accomplished by the Nash Trade platform by pairing this short call "in house" with an underlying long call purchased by Nash_B. In this way. the Nash Trade platform remains regulatory compliant because, to the market exchange, the net play appears as an ordinary credit call spread, with the key difference being that the two positions are taken by disparate players (namely Nash_A as the short call seller, and Nash_B as the long call owner).

Definitions of Relevant Quantities $\alpha$=The level of "Sharing" or, equivalently, the (1−$\alpha$) level of "risk-outsourcing" (also called "risk-sharing") between $Nash_A$ and $Nash_B$, where $0 \leq \alpha \leq 1$.

t=the current time $\Delta t$=the time elapsed since the consummation of the Nash_AB play, where t=0 corresponds to the initiation of this Nash_AB play that is comprised of $Nash_A$'s and $Nash_B$'s offsetting short and long positions, respectively.

S(t)=the spot price of the underlying at t.

S(0)=the spot price of the underlying at t=0.

$\Delta S$=the change in the underling's spot price during the time interval $\Delta t$ $S_A$=the strike price of the short call $S_B$=the strike price of the long call $V_{SC}(0, S_A, S(0))$=the initial short call premium value collected at t=0

$V_{SC}(t, S_A, S(t))$=the short call premium value at t=t, when S=S(t)

$\Delta V_{SC}(t, S_A, S(t)) = \{V_{SC}(t, S_A, S(0)) - V_{SC}(0, S_A, S(0))\}$, the change in the short call value $V_{LC}(0, S_B, S(0))$=the initial long call cost at t=0

$V_{LC}(t, S_B, S(t))$=the long call premium at t=t, when=S(t); here, this is the cost to Nash_B $\Delta V_{LC}(t, S_B, S(t)) = \{V_{LC}(t, S_A, S(t)) - V_{LC}(0, S_A, S(0))\}$, the change in the long call value $M_{LAB}(0)$=the initial legacy premium requirement for a short credit call spread with S_A and S_B as strikes $Nash_{Buffer}(t, S(t))$=the Nash buffer requirements for the S_AB, Nash_A play at time t $\Delta Nash_{Buffer}(t, S(t)) = Nash_{Buffer}(t, S(t)) - Nash_{Buffer}(0, S(0))$, the change in the buffer at t $Nash_{Fee}(t, S_A, S(t))$=the revenue collected by Nash trade from Nash_A for facilitating the AB Nash play, through to t=t; this fee is built into $Nash_{Buffer}(t, S(t))$, and is defined below $Nash_{Margin\ call}(t, S_A, S(t))$=the Nash Trade margin call amount to Nash_A The $Nash_{Buffer}(t, S(t))$ is comprised of the $Nash_{Fee}(t, S_A, S(t))$; that is, Nash Trade's revenue, and an additional amount (discussed below) based on statistical estimates of the change ΔS in the underlying spot price during the time interval from t=0 to t=t.

Remark: Note that α=1 is the case when the players "lone-wolf", as in $Nash_A$, has shorted "naked" on his own while $Nash_B$ went "long" on his own. Thus, there is no real "Sharing" benefit to them save for the interest paid by Nash Trade to $Nash_B$, and the benefit of the significantly lower than legacy initial margin requirements to $Nash_A$.

While, on the other hand, α=0 corresponds to the case where $Nash_A$ is "going Legacy" and buying the long himself. That is, in this case, $Nash_A$ has simply entered into a Legacy short credit call spread with a legacy payoff function in effect for him, and no house margin calls.

Introduction to the Basic Concept—A Special Case Example $S_A = S_B$

First consider the special case where $S_A = S_B$, so, note that in this case:

$$S_B - S_A \stackrel{def}{=} M_{LAB}(0) = 0.$$

That is, as the initial Margin requirement stipulated by the trading platforms or online brokerages must adhere to regulations, typically this initial requirement is the size of the spread. However, in this case, the spread is $0 since both strikes of the derivative options are the same.

For this case at hand, at the initiation of the $Nash_{AB}$ play when t=0, Nash Trade keeps in Nash_A's margin account an amount $Nash_{Cash}(0, S_A, S(0))$, where:

$Nash_{Cash}(0, S_A, S(0)) = V_{SC}(0, S_A, S(0)) + Nash_{Buffer}(0, S(0))$.

The above quantity is thus the Initial Nash-cash Collected from opening or selling the Call to fill Nash_A's position added to the initial $Nash_{Buffer}$.

As mentioned above, in practice, the Short call of the first trader is "simultaneous" with $Nash_B$'s long call position. This is significant for meeting regulatory and market compliance as well as setting appropriate Nash margin calls when necessary, in keeping with an objective of a method aspect of the present invention to manage the risk exposure to Nash trading platform as a result of the $Nash_{AB}$ play.

As time passes, and before a $Nash_{Margin\ call}(t, S_A, S(t))$, an exercise of Nash_A's short $S_A$ call by its buyer (the stock is called away), or a "buy to close" order by Nash_A; a "sell to close" order, or an exercise of the $S_B$ call by $Nash_B$, $Nash_{Cash}$ evolves in time as:

$Nash_{Cash}(t, S_A, S(t)) = Nash_{Cash}(0, S_A, S(0)) - \max\{\max\{0, \Delta V_{SC}(t, S_A, S(t))\}, \Delta S\} - (1-\alpha)*\max\{\max\{0, \Delta V_{LC}, S_A, S(t))\}, \Delta S\}$.

For exposition efficiency we define:

$$\Delta Nash_{Cash}(t, S_A, S(t)) \stackrel{def}{=} -[\max\{\max\{0, \Delta V_{SC}(t, S_A, S(t))\}, \Delta S\} + (1-\alpha)*\max\{\max\{0, \Delta V_{LC}(t, S_A, S(t))\}, \Delta S\}]$$

so that:

$Nash_{Cash}(t, S_A, S(t)) = Nash_{Cash}(0, S_A, S(0)) + \Delta Nash_{Cash}(t, S_A, S(t))$ The max functions above are employed in general because, for a spot price S(t) close to the strike price, changes in the derivative option value over time may be larger than the difference between the spot price and the strike price. This may advantageously enable Nash trade to provide players with the "leanest" or most dynamically robust margin requirements over time.

For spot price movements at a later time t, such that $S(t) \leq S(0)$, $\Delta V_{SC} \leq 0$ because the value of any short call decreases within the market place when the underlying spot price moves down; while $V_{LC} < 0$, because the value of the long call decreases within the market place (barring some anomalous change in demand for these calls), and so the risk to Nash Trade is typically completely mitigated for all possibilities in this range of S(t). Therefore, while the Nash union is active, Nash Trade may return excess to $Nash_A$'s margin only if the current amount held is greater than that collected at t=0; that is if:

$Nash_{Cash}(t, S_A, S(t)) > Nash_{Cash}(0, S_A, (0))$

Of course, an exercise of the short position could occur whenever:

$S(t) > S_A$.

So, in this scenario both $\Delta V_{SC}$ and $\Delta V_{LC}$ may be greater than zero, and so:

$Nash_{Cash}(t, S_A, S(t)) - Nash_{Cash}(0, S_A, S(0)) \leq 0$.

To address this, below we describe the Trigger for the $Nash_{Margin\ call}(t, S_A, S(t))$ as we proceed in time.

The Nash Trade Margin Call

So, at the consummation of this Nash play, at t=0, $Nash_A$ puts up an amount:

$Nash_{Buffer}(0, S(0))$.

This initial requirement is in addition to $Nash_A$ waiting on the legacy short call premium $V_{SC}(0, S_A, S(0))$, until the end of the $Nash_{AB}$ play (should this premium be forthcoming to $Nash_A$ at the end of the $Nash_{AB}$ union). Note that this is the same practice for Legacy platforms.

For the duration of the $Nash_{AB}$ union $V_{SC}(0, S_A, S(0))$, along with $Nash_{Buffer}(0, S(0))$, are "summands" of the $Nash_{AB}$ play's initial margin requirement, and this initial sum in turn will serve to set the $Nash_{AB}$ game in motion, while playing a key initial threshold for setting the $Nash_{Margin\ call}(t, S_A, S(t))$ Call trigger.

To this end, we first note that to satisfy the "continuous" integrity of $Nash_{Cash}(0)$, an additional Nash Margin Call requirement may occur at, say, t. And two cases need be considered, depending on whether or not an "exercise" event occurred.

In addition, Nash Trade needs to account for the possibility that $Nash_B$ exercises his call or "sells to close" it because, in this case, the short call held by trader A is now a "naked Short Call" and this exposes the Nash Trade platform to excessive risk. More precisely, in case of a "sell to close" order by $Nash_B$, Nash Trade needs to be able to buy a new $S_A$ long at a cost of $V_{LC}(t, S_A, S(t))$ (this is the case in the event NASH trade is unable to find a replacement trader for $Nash_B$). Hence, including $\Delta V_{LC}(t, S_A, S(t))$ in the "Nash Trade Margin Trigger" considerations guarantees that Nash Trade will have enough money to "default" the $Nash_{AB}$ play into a $Legacy_{AB}$ play; and this is the reason for the term:

$$-(1-\alpha)*\max\{\max\{0,\Delta V_{LC}(t,S_A,S(t))\},\Delta S\},$$

in the definition of the $Nash_{Cash}(t, S_A, S(t))$ expression above.

So, to start with, an additional Nash Margin Call requirement will occur at, say, t, if:

$$\max\{\max\{0,\Delta V_{SC}(t,S_A,S(t))\}\Delta S\}+(1-\alpha)*\max\{\max\{0,\Delta V_{LC}(t,S_A,S(0))\},\Delta S\}>Nash_{Buffer}(0,S(0))$$

The above inequality will be referred to as the Nash Trade Margin Trigger, or simply the "Trigger"; in other words, when the above inequality is true, then a Nash Trade Margin call is triggered.

Remark: Note that, when $S(t)>S_A$, if the above condition is allowed to persist, Nash Trade may not have enough $Nash_{Cash}(t)$ funds to meet a $Nash_A$ "buy to close order" of his short, or an exercise order from the buyer of this short $Nash_A$ call at a cost of $\Delta V_{SC}(t, S_A, S(t))$ to Nash Trade. Moreover, a "Sell to close" order from $Nash_B$ would put Nash Trade in the "hole" an amount:

$$(1-\alpha)*\Delta V_{LC}(t,S_A,S(t))$$

if $Nash_B$ decides to sell to close before $Nash_A$'s short call is closed out or an exercised.

In addition, mindful of the pending generalization of the above discussion to the case $S_A<S_B$, these above considerations suggest including the terms [S(t)–S(0)] and [S(t)–S(0)], for $S(t)>S_B$, and this will be done later in this description. For now, however, $S_A=S_B$ and so the corresponding relevant quantity would be $2[S(t)-S_A]$; and so, adding this to the buffer Trigger may be a wise safeguard.

Finally, all of the above considerations may be accounted for continuously while at the same time, at the very least, preserving the quantity:

$$V_{SC}(0,S_A,S(0))+Nash_{Buffer}(0,S(0)).$$

Therefore, to account for all possibilities at once, $Nash_A$ may be obliged to meet a $Nash_{Margin\ call}$ in the amount:

$$Nash_{Margin\ call}(t,S_A,S(t))>\max\{\max\{0,\Delta V_{SC}(t,S_A,S(t))\},\Delta S(t)\}+(1-\alpha)*\max\{\max\{0,\Delta V_{LC}(t,S_A,S(t))\},\Delta S(t)\}.$$

So, for example, we may define:

$$Nash_{Margin\ call}(t,S_A,S(t))=\max\{\max\{0,\Delta V_{SC}(t,S_A,S(t))\},\Delta S(t)\}+(1-\alpha)*\max\{\max\{0,\Delta V_{LC}(t,S_A,S(t))\},\Delta S(t)\}+\Delta Nash_{Buffer}(t,S(t)).$$

With $Nash_{Cash}(t)$ evolving in time as:

$$Nash_{Cash}(t,S_A,S(t))=Nash_{Cash}(0,S_A,S(0))-[\max\{\max\{0,\Delta V_{SC}(t,S_A,S(t))\},\Delta S\}+(1-\alpha)*\max\{\max\{0,\Delta V_{LC}(t,S_A,S(t))\},\Delta S\}].$$

so finally note that:

$$Nash_{Cash}(t, S_A, S(t)) =$$
$$Nash_{Cash}(0, S_A, S(0)) + \Delta Nash_{Cash}(t, S_A, S(t)) + Nash_{Margin\ call}(t, S_A, S(t)) =$$
$$Nash_{Cash}(0, S_A, S(0)) + \Delta Nash_{Buffer}(t, S(t)).$$

Now, the righthand side of the inequality may be simplified further because from the definition of $\Delta Nash_{Buffer}(t,S(t))$ it follows:

$$Nash_{Cash}(t, S_A, S(t)) =$$
$$Nash_{Cash}(0, S_A, S(0)) + \Delta Nash_{Buffer}(t, S(t)) = [V_{SC}(0, S_A, S(0)) +$$
$$Nash_{Buffer}(0, S(0))] + [Nash_{Buffer}(t, S(t)) - Nash_{Buffer}(0, S(0))] =$$
$$V_{SC}(0, S_A, S(0)) + Nash_{Buffer}(t, S(t)).$$

And the corresponding payoffs and or benefits to the Nashers will satisfy:

$$Nash_{A_{PayOff}}(t) =$$
$$\left\{ \begin{array}{l} -\alpha*V_{SC}(t, S_A, S(t)), \text{ for } S<S_A+V_{SC}(0, S_A, S(0)) \\ \alpha*V_{LC}(t, S_A, S(t)), \text{ for } S>S_A+V_{SC}(0, S_A, S(0)) \end{array} \right\} + V_{SC}(t, S_A, S(t))$$

while, $$Nash_{B_{PayOff}}(t) =$$
$$\left\{ \begin{array}{l} \alpha*V_{SC}(t, S_A, S(t)), \text{ for } S<S_A+V_{SC}(0, S_A, S(0)) \\ -\alpha*V_{LC}(t, S_A, S(t)), \text{ for } S>S_A+V_{LC}(0, S_A, S(0)) \end{array} \right\} + V_{LC}(t, S_A, S(t))$$

so that, $$Nash_{A_{PayOff}}(t)+Nash_{B_{PayOff}}(t)=Legacy_{AB}(0).$$

Preliminary Discussion of the Nash Trade Algorithm for the More General Case $S_A<S_B$ Using the above analysis as a template and guide, we may readily generalize to all possible ranges of S(t) for the case S_A<S_B and, consequently, show that Nash cash and the other dynamic related quantities comprising it are piecewise defined functions.

In the case under discussion, Nash Trade, effectively has a net AB credit call spread to manage. At the initiation of the Nash_AB play when t=0, Nash Trade keeps in Nash_A's margin account an amount $Nash_{Cash}(0, S_A, S(0))$:

$$Nash_{Cash}(0,S_A,S(0))=V_{SC}(0,S_A,S(0))+M_{LAB}(0)+Nash_{Buffer}(0,S(0)).$$

First note that, for S(t)<S(0), $\Delta V_{SC}(t, S_A, S(t))$ and $\Delta V_{LC}(t, S_A, S(t))$ are both less than or equal to zero, and so the Nash_AB risk is automatically "in check". In fact, as pointed out in the special case $S_A=S_B$ the $Nash_{Margin\ call}(t, S_A, S(t))$ may be negative, in which case a "return" or reduction to $Nash_A$'s margin requirement could occur. See below the discussion of margin reduction.

So, with S(t)>S(0), at the consummation of this Nash play, t=0, $Nash_A$ puts up an amount, we may define as the maintenance sum:

$$M_{LAB}(0) + Nash_{Buffer}(0, S(0))$$

This initial requirement is in addition to Nash_A waiting on the legacy short call premium $V_{SC}(0, S_A, S(0))$, until the end of the Nash_AB play, should this premium indeed be forthcoming to Nash_A at the end of the Nash AB union.

Also note that, above, $M_{LAB}(0)$ is the industry legacy initial margin requirement for the $S_A$ short call's combination with the $S_B$ long call into a standard credit call spread, and is $S_B-S_A$; while $Nash_{Buffer}(0, S(0))$ is an additional quantity that is defined below.

During the duration of the Nash AB union $M_{LAB}(0)$, along with $Nash_{Buffer}(0, S(0))$, are "summands" of the NashAB play's initial margin requirement; and this initial sum in turn will serve to set the Nash_AB in motion, while playing a key threshold for setting an additional $Nash_{Margin\ call}(t, S_A, S(t))$ Call trigger. In a sense, for S_A<S_B, Nash Trade has essentially a "net" AB credit call spread to manage internally.

Following the analysis of the special case discussed above, note that as time passes, and before a $Nash_{Margin\ call}(t, S_A, S(t))$, $Nash_{Cash}$ evolves as:

$$Nash_{Cash}(t,S_A,S(t)) = Nash_{Cash}(0,S_A,S(0)) + \Delta Nash_{Cash}(t,S_A,S(t))$$

where here $\Delta Nash_{Cash}(t, S_A, S(t))$ will have a form similar to, but also different than, the special case discussed above, because the strike prices of the Short and Long calls are different. This fact gives rise to the need to consider three distinct spot price regions for the combined play.

In other words, when we are done with this analysis, it will turn out that $\Delta Nash_{Cash}(t, S_A, S(t))$ is a piecewise defined function.

$$Nash_{Cash}(t,S_A,S(t)) = Nash_{Cash}(0,S_A,S(0)) - \max\{0, \Delta V_{SC}(t,S_A,S(t))\}, \Delta S\} - (1-\alpha)*\max\{\max\{0, \Delta V_{LC}(t,S_B,S(t))\}, \Delta S\}.$$

We then, as above for the special case $S_A=S_B$, address the possibility that there is an assignment or exercise of the short position, which could occur whenever:

$$S(t) > S_A$$

This latter scenario where $S(t)>S_A$, along with the others arising from the different possible spot price position S(t) >S(0), at t=t, will be addressed below.

The Algorithm Development—Case by Case Scenario Analysis; NashTrade Perspective Let the Spot price at the time of either a Nash Margin call, or a Nash AB termination order, t, be S(t)
Case I $S(t) \leq S_A$ Note that no exercise by the buyer of S_A call is likely to occur as he/she would incur losses additional to his/her initial $V_{SC}(0, S_A, S(0))$ premium paid to buy the $S_A$ short call.

Therefore, assuming the above no assignment ordinary circumstances, in this case, if $Nash_A$ gives Nash-trade a buy-to-close order for the S_A strike price option shorted at $t_0=0$, when $t_1=\Delta t$, NashTrade can execute the order and disburse profits to NashA while closing the contract for NashB and disbursing the proceeds due to NashB from $Nash_A$'s profits for offsetting the risk for NashB.

Now, it is also possible that $Nash_B$ may put in a "sell to close" order, in which case Nash Trade needs to address the parting of the mitigating leg of the $Nash_{AB}$ trade.

Two Possibilities Exist for Case I:

$$S(\Delta t) < S(0) \quad (a)$$

$$S(\Delta t) > S(0) \quad (b)$$

Case I (a): In this case, firstly, because S(t)<S(0), the value of the $S_A$ short due to the effect of its negative delta, in addition the negative effect on the $S_A$ short's value due to time decay, together guarantee that Nash trade has sufficient money to settle the Nash AB contract, because in this case we have:

$$\Delta V_{SC}(t,S_A,S(t)) \text{ and } \Delta V_{LC}(t,S_B,S(t)) < 0.$$

So, Nash trade then uses its initial $Nash_{Cash}(0, S_A, S(0))$ to buy to close the S_A option at a price of $V_{SC}(t, S_A, S(t))$, if a "buy to close" order is given by $Nash_A$.

So, the money left after that, is:

$$Nash_{Cash}(0, S_A, S(0)) - V_{SC}(t, S_A, S(t)) =$$

$$V_{SC}(0, S_A, S(0)) + M_{LAB}(0) + Nash_{Buffer}(0, S(0)) - V_{SC}(t, S_A, S(t)) =$$

$$-\Delta V_{SC}(t, S_A, S(t)) + M_{LAB}(0) + Nash_{Buffer}(0, S(0))$$

And, therefore, the net payoff to Nash_A is:

$$Nash_{A_{Net\ payoff\ settelment}}(t, S_A, S(t)) =$$

$$-\Delta V_{SC}(t, S_A, S(t)) + M_{LAB}(0) + Nash_{Buffer}(0, S(0)) - Nash_{Fee}(t, S_A, S(t)).$$

And, so, Nash Trade will have:

$$Nash_{Cash}(t,S_A,S(t)) - Nash_A Net_{payoff} \text{settlement}(t,S_A,S(t)) = [-\Delta V_{SC}(t,S_A,S(t)) + M_{LAB}(0) + Nash_{Buffer}(0,S(0))] - [-\Delta V_{SC}(t,S_A,S(t)) + M_{LAB}(0) + Nash_{Buffer}(0,S(0)) + Nash_{Buffer}(0,S(0)) - Nash_{Fee}(t,S_A,S(t))] = Nash_{Fee}(t,S_A,S(t)),$$

as required. Nash_B is then paid the Nash_I(t) defined below, and the game terminates.
Case I(b): $S(0) < S(t) \leq S_A$
First note that there is no Exercise danger from buyer of V_SC. Moreover, in this Case, $S(t) \geq S(0)$, so time decay might not offset the value increase through the delta of $S_A$ short.

More descriptively, note that for $S(0) < S(t) \leq S_A$, $-\Delta V_{SC}(t, S_A, S(0))$ and $-\Delta V_{LC}(t,S_B,S(t))$ may be positive or negative, depending on whether time decay of $V_{SC}$ and $V_{SC}$ was greater than the increase in value due to the increase in the spot price, in which case it is positive. Alternatively, where the time decay in value was less than the increase in value due to the increase in the spot price, it will be negative.

Therefore, to satisfy the preservation of the initial Nash_ Cash:

$$Nash_{Cash}(0,S_A,S(0)) = V_{SC}(0,S_A,S(0)) + M_{LAB}(0) + Nash_{Buffer}(0,S(0)),$$

an additional Nash Margin Call requirement will occur at, say, t, if for $S(0) < S(t) \geq S_A$, if: the Nash Margin Call trigger is tripped; that is $$\max\{\max\{0, \Delta V_{SC}(t,S_A,S(t))\}, \Delta S\} + (1-\alpha) * \max\{\max\{0, \Delta V_{LC}(t,S_B,S(t))\}, \Delta V_{LC}\} > Nash_{Buffer}(0,S(0))$$

Note that, if the above condition is allowed to persist, Nash-Trade would not have enough Nash_Cash funds to meet a Nash_A "buy to close order" of his short, or replace the Nash_B position should Nash_B put in a "sell to close"

order, and Nash Trade does not find a new Nash_B player, while at the same time, at the minimum, preserve the quantity Nash cash (0, $S_A$, S(0)).

Therefore, to address all the above risks, Nash_A will be obliged to meet a $Nash_{Margin\ call}$ in the amount:

$$Nash_{Margin\ call}(t,S_A,S(t)) = \max\{\max\{0, \Delta V_{SC}(t,S_A,S(t))\}, \Delta S\} + (1-\alpha)*\max\{\max\{0, \Delta V_{LC}(t,S_B,S(t))\}, \Delta S\} + \Delta Nash_{Buffer}(t,S(t))$$

as this, in turn, implies that, after margin call is met by Nash_A:

$$Nash_{Cash}(t, S_A, S(t)) =$$

$$\left[\begin{array}{c} Nash_{Cash}(0, S_A, S(0)) - \max\{\max\{0, \Delta V_{SC}(t, S_A, S(t))\}, \Delta S\} - \\ (1-\alpha)*\max\{\max\{0, \Delta V_{LC}(t, S_B, S(t))\}, \Delta S\}\end{array}\right] +$$

$$Nash_{Margin\ call}(t, S_A, S(t)) =$$

$$\left[\begin{array}{c} Nash_{Cash}(0, S_A, S(0)) - \max\{\max\{0, \Delta V_{SC}(t, S_A, S(t))\}, \Delta S\} - \\ (1-\alpha)*\max\{\max\{0, \Delta V_{LC}(t, S_B, S(t))\}, \Delta S\}\end{array}\right] +$$

$$\max\{\max\{0, \Delta V_{SC}(t, S_A, S(t))\}, \Delta S\} +$$

$$(1-\alpha)*\max\{\max\{0, \Delta V_{LC}(t, S_B, S(t))\}, \Delta S\} +$$

$$\Delta Nash_{Buffer}(t, S(t)) = Nash_{Cash}(0, S_A, S(0)) + \Delta Nash_{Buffer}(t, S(t))$$

where:

$$\Delta Nash_{Buffer}(t, S(t)) \stackrel{def}{=} Nash_{Buffer}(t, S(t)) - Nash_{Buffer}(0, S(0)),$$

it follows that:

$$Nash_{Cash}(t,S_A,S(t)) = Nash_{Cash}(0,S_A,S(0)) + \Delta Nash_{Buffer}(t,S_A,S(t)).$$

This latter quantity $Nash_{Cash}(t, S_A, S(t))$ reduces to:

$$Nash_{Cash}(t,S_A,S(t)) = V_{SC}(0,S_A,S(0)) + M_{LAB}(0) + Nash_{Buffer}(t,S(t)).$$

This, then, will become the updated $Nash_{Cash}(t, S_A, S(t))$ at t=t, that is:

$$Nash_{Cash}(t,S_A,S(t)) = V_{SC}(0,S_A,S(0)) + M_{LAB}(0) + Nash_{Buffer}(t,S(t)).$$

And now that quantity in turn evolves in time t>Δt as:

$$Nash_{Cash}(t,S_A,S(t) = Nash_{Cash}(\Delta t,S_A,S(\Delta t) - \max\{\max\{0, \Delta V_{SC}(t,S_A,S(t))\}, \Delta S\} - (1-\alpha)*\max\{\max\{0, \Delta V_{LC}(0,S_B,S(t))\}, \Delta S\}$$

In short now, for t>Δt, Nash_A will be required to continuously mark Nash Margin requirements to the amount:

$$V_{SC}(0,S_A,S(0)) + M_{LAB}(0) + Nash_{Buffer}(\Delta t,S(\Delta t)).$$

Case II: $S(t) > S_A$

Two possibilities are considered below: namely. $S_A < S(t) \leq S_B$ and $S(t) > S_B$.

Case II (a): $S_A < S(t) < S_A + V_{SC}(0, S_A, S(0))$

In this case, a "buy to close" order from Nash_A, or an "exercise order" by the buyer of the $S_A$ call, as well as a "sell to close" order from Nash_B.

In case of "buy to close" order from Nash_A, $Nash_{Cash}(0, S_A, S(0))$ is reduced by $\Delta V_{SC}(t, S_A, S(t))$, while in the case of an exercise order $Nash_{Cash}(0, S_A, S(0))$ is reduced by ΔS.

This suggests that the $Nash_{Margin\ call}(t, S_A, S(t))$ should account for the possibilities, "buy to close" or "call away", and a "sell to close" order from Nash_B, while keeping the $Nash_{Margin\ call}(t, S_A, S(t))$ at a minimum.

To accomplish this, we may recall that:

$$Nash_{Margin\ call}(t,S_A,S(t)) = \max\{\max\{0, \Delta V_{SC}(t,S_A,S(t))\}, \Delta S\} + (1-\alpha)*\max\{\max\{0, \Delta V_{LC}(t,S_B,S(t))\}, \Delta S\} + \Delta Nash_{Buffer}(t,S(t)).$$

So, we have:

$$Nash_{Cash}(t,S_A,S(t)) = Nash_{Cash}(0,S_A,S(0)) + \max\{\max\{0, \Delta V_{SC}(t,S_A,S(t))\}, \Delta S\} - (1-\alpha)*\max\{\max\{0, \Delta V_{LC}(t,S_B,S(t))\}, \Delta S\} + Nash_{margin\ call}(t,S_A,S(t))$$

This may immediately be rewritten as:

$$Nash_{Cash}(t, S_A, S(t)) = Nash_{Cash}(0, S_A, S(0)) + \Delta Nash_{Buffer}(t, S(t)) =$$

$$V_{SC}(0, S_A, S(0)) + M_{LAB}(0) + Nash_{Buffer}(t, S(t)).$$

In this case, Nash_A gets, as usual:

$$Nash_A Net_{payoff} settlement(t,S_A,S(t)) = Nash_{Cash}(t,S_A,S(t)) - Nash_{Fee}(t,S_A,S(t))$$

so that:

$$Nash_{Cash}(t,S_A,S(t)) - Nash_A Net_{payoff} settlement(t,S_A,S(t)) = Nash_{Fee}(t,S_A,S(t))$$

Case II (b): $S(t) > S_B$

In this case, Nash_B can also exercise his long call and drop out of the game. So that to ensure that Nash Trade can replace the call, we must include the quantity $S(t)-S\_B$ in the Nash Margin Call. Therefore, based on that consideration and the above related cases, we have that the form of the margin call and Margin call trigger remain the same.

Summary of all the Relevant Piecewise Functions of the Nash Trade Call Short

Summarizing the above discussion into piecewise functions, we therefore have:

$$Nash_{A_{PayOff}}(t) =$$

$$\begin{cases} -\alpha * V_{SC}(t, S_A, S(t)), \text{ for} \\ S < S_A + V_{SC}(0)\min\{0, -\alpha * V_{SC}(t, S_A, S(t))\}, \text{ for} \\ S_A + V_{SC}(0) < S < S_B + V_{LC}(0)\alpha * V_{LC}(t, S_B, S(t)), \text{ for} \\ S > S_B + V_{LC}(0) \end{cases} +$$

$$V_{SC}(t, S_A, S(t))$$

while, $$Nash_{B_{PayOff}}(t) =$$

$$\begin{cases} \alpha * V_{SC}(t, S_A, S(t)), \text{ for} \\ S < S_A + V_{SC}(0) - \min\{0, -\alpha * V_{SC}(t, S_A, S(t))\}, \text{ for} \\ S_A + V_{SC}(0) < S < S_B + V_{LC}(0) - \alpha * V_{LC}(t, S_B, S(t)), \text{ for} \\ S > S_B + V_{LC}(0) \end{cases} +$$

$$V_{LC}(t, S_B, S(t))$$

so that, $$Nash_{A_{PayOff}}(t) + Nash_{B_{PayOff}}(t) = Legacy_{AB}(0).$$

The Nash Buffer Structure-Preliminary Discussion

We consider the $Nash_{Buffer}$ structure for the cases considered above.

At the most elementary level we put:

$$Nash_{Buffer}(t,S(t)) = Nash_{Fee}(t,S_A,S(t)) + \Delta S_{nash_{estimate}}(t) * (\delta_{short}(S(t)) + \alpha * \delta_{long}(S(t))).$$

The term $\Delta S_{nash_{estimate}}(t)$ will be discussed below, while the $\delta_{short}(S(t))$, and $\delta_{long}(S(t))$ are the first order Greeks of the short and long call, respectively.

So, at t=Δt, if $Nash_{Buffer}(0, S(0))$ needs to be updated as a result of a Nash margin call, the new buffer becomes:

$$\text{Nash}_{buffer}(\Delta t, S(\Delta t)) = \text{Nash}_{Fee}(\Delta t, S_A, S(0)) + \Delta S_{nash_{estimate}}$$
$$(\Delta t) * (-\delta_{short}(S(\Delta t)) + \alpha * \delta_{long}(S(\Delta t))).$$

First, in one rendering of this Nash short call trading algorithm, $\text{Nash}_{Fee}(t, S_A, S(0))$ can be simply the interest on the legacy short margin requirements, say, M_legacy_short $(0, S_A, S(0))$, that Nash_A would have to put-up, where that interest is calculated at legacy rate r_legacy_short (typically 10% per annum).

That is:

$$\text{Nash}_{Fee}(t, S_A, S(0)) = M\_legacy\_Naked\_short(0, S_A, S(0))$$
$$* [1 - \exp(r_{legacy_{short}} * t)]$$

Typically, the M_legacy_Naked_short$(0, S_A, S(0))$ satisfies:

$$M(t)_{legacy_{Naked_{short}}} = V_{SC}(0, S_A, S(0)) + \max\{0.2S(t) + (S(t) - S_A), 0.1S(t)\}$$

As will be seen below, the $\text{Nash}_{Buffer}(t, S(t))$ is smaller than the prohibitive legacy naked short buffer margin requirement of $$M(t)_{legacy_{Naked_{short}}},$$

namely the quantity:

$$\max\{0.2S(t) + (S(t) - S_A), 0.1S(t)\}.$$

This is possible because the risk exposure to Nash Trade is then mitigated by the pairing of this naked short with a long position (i.e., a coalesced order using the Nash Trade platform).

Now, because both $\delta_{short}(S(t))$, $\delta_{long}(S(t))$ are determined by the market, the remaining question is how to address the estimation of $\Delta S_{nash_{estimate}}(t)$. We describe this below.

The Nash $\Delta S_{nash_{estimate}}(t)$

We may base the structure of the $\Delta S_{nash_{estimate}}(t)$ on the most commonly used stochastic model of stock price behavior:

$$dS = \mu S dt + \delta S dz$$

where dz is a geometric Brownian motion. The discrete time version of this model is:

$$\Delta S = \mu S \Delta t + \delta S \varepsilon \sqrt{\Delta t}$$

where $\varepsilon$ is a random drawing from the standard normal distribution $N(0,1)$.

Define: X $$\stackrel{def}{=}$$

$\Delta S/S$, then it follow s that:

$$X \sim \phi(\mu dt, \delta^2 dt).$$

That is, X is normally distributed with mean $\mu dt$, and variance $\delta^2 dt$.

For Nash Trade to adopt a conservative approach to estimating $\Delta S_{nash_{estimate}}$, we consider a "worst case" scenario and so we posit to use quantity $E(X|x \geq \mu \Delta t)$, where:

$$E(X|x \geq \mu dt) = \frac{1}{\sqrt{2\pi\sigma^2 dt}} \int_{\mu dt}^{\infty} xe^{-\frac{(x-\mu dt)^2}{2\sigma^2 dt}} dx,$$

and subsequently define $\Delta S(t)_{nash_{estimate}} = S(t) * E(X|x \geq \mu \Delta t)$.

Evaluating the above expectation, we find:

$$E(X|x \geq \mu \Delta t) = \frac{1}{\sqrt{2\pi}} \left\{ \frac{\mu \Delta t}{2} + \sigma \sqrt{\Delta t} \right\}.$$

And so, we arrive at the $\Delta S_{nash_{estimate}}$:

$$\Delta S(t)_{Nash\ estimate} = \frac{S(t)}{\sqrt{2\pi}} \left\{ \frac{\mu \Delta t}{2} + \sigma \sqrt{\Delta t} \right\}.$$

For a sense of the size of $E(X|x \geq \mu \Delta t)$, take $\Delta t = 0.02$ (about 1 week) $\mu = 0.15$, and $\sigma = 0.3$ to obtain:

$$\Delta S(t)_{Nash_{estimate}} = \frac{S(t)}{\sqrt{2\pi}} \{0.0438\} = 0.00697 S(t).$$

so that initially $\text{Nash}_{Buffer}$ would be no more than 1% of the underlying stock value.

With all of the above analysis thus far, we are in a position to generalize the Nash Trade algorithm to the case where $S_A < S_B$. We venture to this goal in Appendix I(b).

Appendix I(b) Mathematical Definitions for the Sharing Functions used in Examples 1-5

In this Appendix I(b), all of the terms and symbols that appear in the equations below are the same as defined in the beginning of Appendix I(a). The purpose of this appendix is to explicitly state the mathematical form of the specific sharing level, $\alpha$, that was used in the corresponding Examples 2-5 of the disclosure so that this, together with the general mathematical structure of the payoffs for $\text{Nash}_{A_{PayOff}}(t)$ and $\text{Nash}_{B_{PayOff}}(t)$ (clients 202 and 222, respectively) discussed in Appendix I(a) will yield the specific related figure's components discussed in the detailed description of the disclosure.

As appears in Appendix I(a), the pair of payoff functions emerging from the analysis were:

$$\text{Nash}_{A_{PayOff}}(t) =$$

$$\left\{ \begin{array}{l} -\alpha * V_{SC}(t, S_A, S(t)), \text{ for } S < S_A + V_{SC}(0, S_A, S(0)) \\ \alpha * V_{LC}(t, S_A, S(t)), \text{ for } S > S_A + V_{SC}(0, S_A, S(0)) \end{array} \right\} + V_{SC}(t, S_A, S(t))$$

while, $$\text{Nash}_{B_{PayOff}}(t) =$$

$$\left\{ \begin{array}{l} \alpha * V_{SC}(t, S_A, S(t)), \text{ for } S < S_A + V_{SC}(0, S_A, S(0)) \\ -\alpha * V_{LC}(t, S_A, S(t)), \text{ for } S > S_A + V_{LC}(0, S_A, S(0)) \end{array} \right\} + V_{LC}(t, S_A, S(t))$$

so that, $$\text{Nash}_{A_{PayOff}}(t) + \text{Nash}_{B_{PayOff}}(t) = \text{Legacy}_{AB}(t).$$

Recall that the above payoffs correspond to the cases for which the strike price chosen by both Clients 202 and 222 is the same; that is, $S_A = S_B$. Therefore, they are relevant to Examples 2 and 4 only.

For Examples 3 and 5, where $S_A \neq S_B$, the analysis of Appendix I(a) yielded an appropriately modified form analogous to the pair above. Specifically:

$$Nash_{A_{PayOff}}(t) =$$

$$\begin{Bmatrix} -\alpha * V_{SC}(t, S_A, S(t)), \text{ for} \\ S < S_A + V_{SC}(0)\min\{0, -\alpha * V_{SC}(t, S_A, S(t))\}, \text{ for} \\ S_A + V_{SC}(0) < S < S_B + V_{LC}(0)\alpha * V_{LC}(t, S_B, S(t)), \text{ for} \\ S > S_B + V_{LC}(0) \end{Bmatrix} +$$

$$V_{SC}(t, S_A, S(t))$$

while, $$Nash_{B_{PayOff}}(t) =$$

$$\begin{Bmatrix} \alpha * V_{SC}(t, S_A, S(t)), \text{ for} \\ S < S_A + V_{SC}(0) - \min\{0, -\alpha * V_{SC}(t, S_A, S(t))\}, \text{ for} \\ S_A + V_{SC}(0) < S < S_B + V_{LC}(0) - \alpha * V_{LC}(t, S_B, S(t)), \text{ for} \\ S > S_B + V_{LC}(0) \end{Bmatrix} +$$

$$V_{LC}(t, S_B, S(t))$$

so that we have:

$$Nash_{A_{PayOff}}(t) + Nash_{B_{PayOff}}(t) = Legacy_{AB}(t).$$

Therefore, all that need be specified to uniquely define the Example-Specific pair of payoff functions are 1) the strike prices $S_A$, $S_B$; 2) the initial legacy premiums $V_{SC}(0, S_A, S(0))$, $V_{LC}(0, S_B, S(0))$, and 3) of course, the corresponding sharing function, $\alpha$, that was used in the specific example discussed in the detailed description.

The terms $V_{SC}(t, S_A, S(t))$, $V_{LC}(t, S_B, S(t))$ represent the time-evolved values of the derivatives post coalescing-consummation of client 202's and client 222's disparate and complimentary positions at t=0. These values are typically computed using one of two mathematical price modeling techniques: namely, the well-known Black-Scholes equation, or the Binomial simulation method. Ultimately, as one skilled in the practice would immediately recognize, the actual market value of the derivative will in general deviate from the theoretical value produced by these two methods. The main reasons are market forces such as supply and demand, and the underlying stock's liquidity state which typically generates the Bid-Ask spreads seen for it on exchange venues.

Regardless of the time valued quantities for $V_{SC}(t, S_A, S(t))$, $V_{LC}(t, S_B, S(t))$ and the way that they are determined as alluded to in the last paragraph above, it is assumed below that the margin calls discussed in Appendix I(a) have all been met post coalescing-consummation at t=0 and, thus, both complimentary positions making up the net trade persist until the expiration time T of the two derivatives involved in Examples 1 through 5. In other words, the individual component of the payoff graphs shown in the FIGS. 9-21 correspond to the terminal payoff function of the individual derivative it represents.

In the notation of this work therefore, these would be denoted as:

$$V_{SC}(T, S_A, S(T)), V_{LC}(T, S_B, S(T))$$

and are thus nothing more than the usual Legacy terminal payoff functions corresponding to these derivatives.

In addition, note that, in contrast to Examples 2-5, Example 1 directly relates to the prototype demo FIGS. 13-17 discussed in this teaching. The payoff functions $Nash_{A_{PayOff}}(t)$ and $Nash_{B_{PayOff}}(t)$ were generated without using the legacy values $V_{SC}(T, S_A, S(T))$ and $V_{LC}(T, S_B, S(T))$ but, rather, this payoff function pair was built using a composition of functions, specified below, used to create the individual payoffs 1502 of FIGS. 13 and 1602 FIG. 14.

This fact attests to the advantageous power and flexibility offered by the present invention, and drives home that there are many ways to coalesce complementary positions, as long as they sum up to the legacy payoff:

$$V_{SC}(T, S_A, S(T)) + V_{LC}(T, S_B, S(T)),$$

without changing the object of the present invention.

Specifications of the "sharing functions" parameter values used in Examples 1-5

Example 1 (FIG. 17)

$S_A$=$2000, $S_B$=$2020, $V_{SC}(0, S_A, S(0))$=$10, $V_{LC}(0, S_B, S(0))$=−$5, $V_{SC}(T, S_A, S(T))$ is depicted in FIG. 15 item 1106, while $V_{LC}(T, S_B, S(T))$ is depicted in FIG. 16 item 1206.

The terminal payoff functions for Client 202 and Client 222 respectively are formally defined as:

$$Nash_{A_{PayOff}}(T) = 8(S_B - S_A)B(S)H(S) \text{ where:}$$

$$B(S) = \frac{12[S - (S_A + S_B)/2][(3S_B - 2S_A) - S]}{[2.5(S_B - S_A)]^2} + 1 \text{ and}$$

$$H(S) = \frac{-S - (S_A + S_B)/2}{(S - (S_B + S_A)/2)^2 + ((S_B - S_A)/2)^2}.$$

With the above parameter values substituted into $Nash_{A_{PayOff}}(T)$ above, we obtain the profit and loss profile item 1502 of FIG. 17 for Client 202; and thus, finally, its complement profit and loss profile item 1602 of FIG. 17 for Client 222 is then defined as:

$$Nash_{B_{PayOff}}(T) = Legacy_{AB}(T) - Nash_{A_{PayOff}}(T)$$

Example 2 (FIG. 18)

$\alpha$=0.4; $S_A$=$2000, $S_B$=$2000, $V_{SC}(0, S_A, S(0))$=$10, $V_{LC}(0, S_B, S(0))$=−$10, $V_{SC}(T, S_A, S(T))$ is depicted in FIG. 18 item 2010, while $V_{LC}(T, S_B, S(T))$ is depicted in FIG. 18 item 2002. With the above parameters substituted into the first pair of payoff functions above, we obtain the profit and loss profile item 2008 of FIG. 18 for Client 202, and its complement profit and loss profile item 2004 of FIG. 18 for Client 222.

Example 3 (FIG. 19)

$\alpha$=0.4; $S_A$=$2000, $S_B$=$2020, $V_{SC}(0, S_A, S(0))$=$30, $V_{LC}(0, S_B, S(0))$=−$20, $V_{SC}(T, S_A, S(T))$ is depicted in FIG. 19 item 2110, while $V_{LC}(T, S_B, S(T))$ is depicted in FIG. 19 item 2102. With the above parameters substituted into the first pair of the general payoff functions discussed above, we obtain the profit and loss profile item 2108 of FIG. 19 for Client 202, and its complement profit and loss profile item 2104 of FIG. 19 for Client 222.

Example 4 (FIG. 20)

$$\alpha(S) = -0.6/(((0.05)*(S-\{S_A+S_B\}/2))^2+1)+0.1$$

$S_A$=$2000, $S_B$=$2000, $V_{SC}(0, S_A, S(0))$=$10, $V_{LC}(0, S_B, S(0))$=−$10, $V_{SC}(T, S_A, S(T))$ is depicted in FIG. 20 item 2208, while $V_{LC}(T, S_B, S(T))$ is depicted in FIG. 20 item 2204.

With the above parameters substituted into the first pair of the general payoff functions discussed above, we obtain the profit and loss profile item 2210 of FIG. 20 for Client 202, and its complement profit and loss profile item 2202 of FIG. 20 for Client 222.

Example 5 (FIG. 21)

$$\alpha(S) = -0.6/(((0.05)*(S-\{S_A+S_B\}/2))^2+1)+0.1$$

$$S_A=\$2000, S_B=\$2020, V_{SC}(0,S_A,S(0))=\$40, V_{LC}(0,S_B,S(0))=-\$20,$$

$V_{SC}(T, S_A, S(T))$ is depicted in FIG. 21 item 2302, while $V_{LC}(T, S_B, S(T))$ is depicted in FIG. 21 item 2310.

With the above parameters substituted into the second pair of the general payoff functions discussed above, we obtain the profit and loss profile item 2308 of FIG. 21 for Client 202, and its complement profit and loss profile item 2304 of FIG. 21 for Client 222.

That which is claimed is:

1. A social networking service (SNS) system [200] for counter-party trading comprising:
   a trader client app [208] in a networked environment [204] and including a first processor [104], configured to:
      display [1000] a first interactive selection disk [1002]; and
      interpret a first manual manipulation of the first interactive selection disk [1002] to define a trade sharing level election [1104];
   a counter-trader client app [208] in the networked environment [204] and including a second processor [104], configured to:
      display [1000] a second interactive selection disk [1002]; and
      interpret a second manual manipulation of the second interactive selection disk [1002] to define a counter-trade sharing level election [1204]; and
   a server [206] in the networked environment [204] configured to:
      receive a trade transaction record [2402] characterized by the trade sharing level election [1104];
      receive a counter-trade transaction record [2402] characterized by the counter-trade sharing level election [1204];
      determine, using the trade sharing level election [1104] and the counter-trade sharing level election [1204]:
         a trade payoff function [1106] defined by a short call premium value $V_{SC}$ (an expiration time T, a trading strike price $S_A$, a spot price S(T)), and
         a counter-trade payoff function [1206] defined by a long call premium value $V_{LC}$ (the expiration time T, a counter-trade strike price $S_B$, the spot price S(T));
      detect a complementary risk correlation [2404] defined by the trade payoff function [1106]+the counter-trade payoff function [1206]=a legacy payoff Legacy$_{AB}$(T) [1504]; and
      create, using the complementary risk correlation [2404], a coalesced order transaction record [2408] from the trade transaction record [2402] and the counter-trade transaction record [2402].

2. The SNS system [200] according to claim 1, further comprising:
   the trade client app [208] in the networked environment [204] further configured to display [1300] the trade payoff function [1106] for the coalesced order transaction record; and
   the counter-trade client app [208] in the networked environment [204] further configured to display [1400] the counter-trade payoff function [1206] for the coalesced order transaction record [2408].

3. The SNS system [200] according to claim 1, wherein the coalesced order transaction record [2408] is of an exchange-traded asset type selected from the group consisting of an equity type, a security type, a commodity type, an option type, a future type, and a currency type.

4. The SNS system [200] according to claim 3, wherein the trade transaction record [2402] is of a naked short call type [1102], the counter-trade transaction record [2402] is of a long call type [1202], and the coalesced order transaction record [2408] is of the equity type [502] and further of a call spread type [502] [702].

5. The SNS system [200] according to claim 1, wherein the trade sharing level election [1104] comprises a profit target; and the counter-trade sharing level election [1204] comprises a loss target.

6. The SNS system [200] according to claim 1, wherein the trade sharing level election [1104] comprises a trade margin reduction target; and the counter-trade sharing level election [1204] comprises a counter-trade margin reduction target.

7. The SNS system [200] according to claim 1, wherein the server [206] is further configured to:
   transmit, based on the complementary risk correlation [2404], a respective coalesced trade acceptance prompt [1300] [1400] to each of the trader client app [208] and the counter-trader client app [208]; and
   receive from at least one of the trader client app [208] and the counter-trader client app a respective coalesced trade acceptance [1304] [1402].

8. The SNS system [200] according to claim 1, wherein at least one of the trade sharing level election [1104] and the counter-trade sharing level election [1204] is of a sharing type selected from the group consisting of constant [2100], linear [2000], and non-linear [1900].

9. A method for counter-party trading using a social networking service (SNS) system [200] comprising a trader client app [208] in a networked environment [204] and including a first processor [104], a counter-trader client app [208] in the networked environment [204] and including a second processor [104], and a server [206] in the networked environment [204]; the SNS system [200] configured to perform the method [2400] comprising the steps of:
   displaying [1000], using the trader client app [208], a first interactive selection disk; [1002];
   interpreting, using the trader client app [208], a first manual manipulation of the first interactive selection disk [1002] to define a trade sharing level election [1104];
   displaying [1000], using the counter-trader client app [208], a second interactive selection disk [1002];
   interpreting, using the counter-trader client app [208], a second manual manipulation of the second interactive selection disk [1002] to define a counter-trade sharing level election; [1204];
   receiving, using the server [206], a trade transaction record [2402] characterized by the trade sharing level election [1104];

receiving, using the server [206], a counter-trade transaction record [2402] characterized by the counter-trade sharing level election [1204];

determining, using the server [206], from the trade sharing level election [1104] and the counter-trade sharing level election [1204] a trade payoff function [1106] defined by a short call premium value $V_{SC}$ (an expiration time T, a trading strike price $S_A$, a spot price S(T)) and a counter-trade payoff function [1206] defined by a long call premium value $V_{LC}$ (the expiration time T, a counter-trade strike price $S_B$, the spot price S(T)); and upon detecting, using the server [206], a complementary risk correlation [2404] defined as the trade payoff function [1106]+the counter-trade payoff function [1206]=a legacy payoff Legacy$_{AB}$(T) [1504], creating a coalesced order transaction record [2408] from the trade transaction record [2402] and the counter-trade transaction record [2402].

10. The method according to claim 9, further comprising:

displaying [1300], using the trader client app [208], the trade payoff function [1106] for the coalesced order transaction record [2408]; and displaying [1400], using the counter-trader client app [208], the counter-trade payoff function [1206] for the coalesced order transaction record [2408].

11. The method according to claim 10, further comprising:

transmitting, using the server [206] and based on the complementary risk correlation, [2404] a respective coalesced trade acceptance prompt [1300] [1400] to each of the trader client app [208] and the counter-trader client app [208]; and receiving, using the server [206], from at least one of the trader client app [208] and the counter-trader client app [208] a respective coalesced trade acceptance [1304] [1402].

12. The method according to claim 9, wherein the coalesced order transaction record [2408] is of an exchange-traded asset type selected from the group consisting of an equity type, a security type, a commodity type, an option type, a future type, and a currency type.

13. The method according to claim 12, wherein the trade transaction record [2402] is of a naked short call type [1102], the counter-trade transaction record [2402] is of a long call type [1202], and the coalesced order transaction record [2408] is of the equity type [502] and further of a call spread type [502] [702].

14. The method according to claim 9, wherein the trade sharing level election [1104] comprises a profit target; and the counter-trade sharing level election [1204] comprises a loss target.

15. The method according to claim 9, wherein the trade sharing level election [1104] comprises a trade margin reduction target; and the counter-trade sharing level election [1204] comprises a counter-trade margin reduction target.

16. The method according to claim 9, wherein at least one of the trade sharing level election [1104] and the counter-trade sharing level election [1204] is of a sharing type selected from the group consisting of constant [2100], linear [2000], and non-linear [1900].

17. A computer-implemented method of social networking for counter-party trading, the method [2400] comprising the steps of:

displaying [1000], using a trader client app [208] having a first processor [104], a first interactive selection disk [1002];

interpreting, using the trader client app [208], a first manual manipulation of the first interactive selection disk [1002] to define a trade sharing level election [1104];

displaying [1000], using a counter-trader client app [208] having a second processor, [104], a second interactive selection disk [1002];

interpreting, using the counter-trader client app [208], a second manual manipulation of the second interactive selection disk [1002] to define a counter-trade sharing level election; [1204];

receiving, using a server [206], a trade transaction record [2402] characterized by a trade sharing level election [1104];

receiving, using the server [206], a counter-trade transaction record [2402] characterized by a counter-trade sharing level election [1204];

determining, using the server [206], from the trade sharing level election [1104] and the counter-trade sharing level election [1204] a trade payoff function [1106] defined by a short call premium value $V_{SC}$ (an expiration time T, a trading strike price $S_A$, a spot price S(T)) and a counter-trade payoff function [1206] defined by a long call premium value $V_{LC}$ (the expiration time T, a counter-trade strike price $S_B$, the spot price S(T)); and upon detecting, using the server [206], a complementary risk correlation [2404] of the trade sharing level election [1104] and the counter-trade sharing level election [1204] defined by the trade payoff function [1106]+the counter-trade payoff function [1206]=a legacy payoff Legacy$_{AB}$(T) [1504], determining a coalesced order transaction record [2408] from the trade transaction record [2402] and the counter-trade transaction record [2402].

18. The method according to claim 17, wherein the coalesced order transaction record [2408] is of an exchange-traded asset type selected from the group consisting of an equity type, a security type, a commodity type, an option type, a future type, and a currency type.

19. The method according to claim 17, wherein the trade sharing level election [1104] comprises a profit target; and the counter-trade sharing level election [1204] comprises a loss target.

20. The method according to claim 17, wherein at least one of the trade sharing level election [1104] and the counter-trade sharing level election [1204] is of a sharing type selected from the group consisting of constant [2100], linear [2000], and non-linear [1900].

* * * * *